(12) United States Patent
Bagheri et al.

(10) Patent No.: US 10,911,204 B2
(45) Date of Patent: Feb. 2, 2021

(54) METHOD AND APPARATUS FOR REPORTING CHANNEL STATE INFORMATION

(71) Applicant: Motorola Mobility LLC, Chicago, IL (US)

(72) Inventors: Hossein Bagheri, Urbana, IL (US); Ravikiran Nory, Buffalo Grove, IL (US); Vijay Nangia, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/717,929

(22) Filed: Sep. 27, 2017

(65) Prior Publication Data

US 2018/0097604 A1    Apr. 5, 2018

Related U.S. Application Data

(60) Provisional application No. 62/402,719, filed on Sep. 30, 2016.

(51) Int. Cl.
*H04L 5/00* (2006.01)
*H04W 72/04* (2009.01)
(Continued)

(52) U.S. Cl.
CPC .......... *H04L 5/0055* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS

| 8,385,268 B2 | 2/2013 | Chen et al. |
| 9,031,025 B2 | 5/2015 | Nakao et al. |
| (Continued) | | |

FOREIGN PATENT DOCUMENTS

WO    2013009110 A2    1/2013

OTHER PUBLICATIONS

AJID, Notice of References Cited, U.S. Appl. No. 15/717,906, U.S. Patent and Trademark Office, file Nov. 2, 2018.
(Continued)

*Primary Examiner* — Jutai Kao
(74) *Attorney, Agent, or Firm* — Loppnow & Chapa; Matthew C. Loppnow

(57) ABSTRACT

A first set of control decoding candidates corresponding to a first transmit time interval length in a subframe can be monitored when a device is not configured to communicate using a second transmit time interval length in the subframe. The second transmit time interval length can be shorter than the first transmit time interval length. A second set of control decoding candidates corresponding to the first transmit time interval length in the subframe can be monitored when the device is configured to communicate using the second transmit time interval length in the subframe. The first and the second sets can be different. A number of candidates in the second set can be less than a number of candidates in the first set.

22 Claims, 16 Drawing Sheets

(51) Int. Cl.
*H04W 72/08* (2009.01)
*H04W 24/08* (2009.01)
*H04W 72/06* (2009.01)

(52) U.S. Cl.
CPC .......... *H04L 5/0053* (2013.01); *H04L 5/0057* (2013.01); *H04W 24/08* (2013.01); *H04W 72/044* (2013.01); *H04W 72/0406* (2013.01); *H04W 72/0413* (2013.01); *H04W 72/0446* (2013.01); *H04W 72/082* (2013.01); *H04W 72/085* (2013.01); *H04L 5/0023* (2013.01); *H04W 72/0466* (2013.01); *H04W 72/06* (2013.01)

(56) References Cited

U.S. PATENT DOCUMENTS

| | | |
|---|---|---|
| 2013/0083666 A1 | 4/2013 | Gaal |
| 2014/0092822 A1 | 4/2014 | Koorapaty et al. |
| 2014/0198720 A1 | 7/2014 | Gaal et al. |
| 2015/0029953 A1 | 1/2015 | Chen et al. |
| 2015/0296488 A1 | 10/2015 | Shimezawa et al. |
| 2015/0334729 A1 | 11/2015 | Ji et al. |
| 2016/0205676 A1 | 7/2016 | Chen et al. |
| 2016/0270059 A1 | 9/2016 | Chen et al. |
| 2016/0330630 A1 | 11/2016 | Yoo et al. |
| 2016/0338046 A1 | 11/2016 | Chen et al. |
| 2017/0265169 A1 | 9/2017 | Chen et al. |
| 2017/0289985 A1 | 10/2017 | Yang et al. |
| 2017/0290004 A1 | 10/2017 | Yang |
| 2017/0332377 A1* | 11/2017 | Tseng .................... H04W 24/00 |
| 2017/0353976 A1 | 12/2017 | Yerramalli et al. |
| 2017/0359805 A1 | 12/2017 | You et al. |
| 2018/0014301 A1 | 1/2018 | Chen et al. |
| 2018/0048447 A1 | 2/2018 | Nogami |
| 2018/0192354 A1 | 7/2018 | Yi et al. |
| 2018/0234998 A1* | 8/2018 | You .......................... H04L 5/00 |
| 2018/0324797 A1 | 11/2018 | Hosseini et al. |
| 2019/0141679 A1* | 5/2019 | He ........................ H04L 5/0053 |
| 2019/0229874 A1 | 7/2019 | Lee |
| 2019/0312669 A1 | 10/2019 | Kwak |
| 2019/0349046 A1 | 11/2019 | Liu |
| 2019/0394768 A1 | 12/2019 | Kim |

OTHER PUBLICATIONS

Interdigital Communications: "On sPDCCH 1-9, Design", 3GPP Draft; R1-167654 STTI SPDCCH, 3rd Generation Partnership Project (3GPP), vol. RAN WG1, No. Gothenburg, Sweden; Aug. 22-26, 2016, Aug. 21, 2016.
LG Electronics: "Discussions on sPDCCH for latency reduction", 3GPP Draft; R1-166858 Discussions on SPDCCH for Latency Reduction, 3rd Generation Partnership Project (3GPP), vol. RAN WG1, No. Gothenburg, Sweden; Aug. 22-26, 2016, Aug. 21, 2016.
Tejera, International Search Report, International application No. PCT/US2017/054192, European Patent Office, Rijswijk, dated Dec. 8, 2018.
Ericsson: "sPDCCH search space design", 3GPP Draft; R1-167487, 3rd Generation Partnership Project (3GPP), vol. RAN WG1, No. Gothenburg, Sweden; Aug. 22-26, 2016, Aug. 21, 2016.
Tejera, International Search Report, International Application No. PCT/US2017/054191, European Patent Office, Rijswijk, NL, dated Dec. 7, 2017.
Huawei et al: "PDSCH design for short TTI", 3GPP Draft; R1-166151, 3rd Generation Partnership Project (3GPP), Mobile Competence Centre; 650, Route Des Lucioles ; F-06921 Sophia-Antipolis Cedex ; France, vol. RAN WG1, No. Gothenburg, Sweden; Aug. 22-26, 2016, Aug. 21, 2016.
Huawei et al: "Evaluation methodology for TTI shortening", 3GPP Draft; R1-157498, 3rd Generation Partnership Project (3GPP), Mobile Competence Centre; 650, Route Des Lucioles ; F-06921 Sophia-Antipolis Cedex ; France, vol. RAN WG1, No. Anaheim, USA; Nov. 15-22, 2015, Nov. 24, 2015.
Motorola Mobility: CSI aspects of shortened TTI operation, 3GPP Draft; R1-1609916 SCSI VO, 3rd Generation Partnership-Project (3GPP), Mobile Competence Centre; 650, Route Des Lucioles ; F-06921 Sophia-Antipolis Cedex ; France, vol. RAN WG1, No. Lisbon, Portugal; Oct. 10-14, 2016, Oct. 1, 2016.
NTT DOCOMO Inc: "Views on CSI feedback for shortened TTI with reduced processing time", 3GPP Draft; RI-1612699, 3rd Generation Partnership Project (3GPP), Mobile Competence Centre; 650, Route Des Lucioles ; F-06921 Sophia-Antipolis Cedex ; France, vol. RAN WG1, No. Reno, USA; Nov. 14-18, 2016, Nov. 13, 2016.
Orozco Roura, PCT International Search Report, International Application No. PCT/US2017/054187, European Patent Office, Rijswijk, NL, dated Dec. 15, 2017.
Huawei et al: "Discussion on CSI feedback for short TTI", 3GPP Draft; R1-166157, 3rd Generation 20 Partnership Project (3GPP), Mobile Competence Centre . • 650, Route Des Lucioles .• F-06921 Sophia-Antipolis Cedex • France • vol. RAN WG1, No. Gothenburg, Sweden; Aug. 22-26, 2016, Aug. 21, 2016.
Huawei et al: "Discussion on CSI feedback for short TTI". 3GPP Draft; R1-164065, 3rd Generation Partnership Project (3GPP), Mobile Competence Centre. 650, Route Des Lucioles. F-06921 Sophia-Antipolis Cedex, France, vol. RAN WG1, No. Nanjing, China; May 23-27, 2016 May 14, 2016.
LG Electronics: sPUCCH design for CSI feedback with shortened TTI length, 3GPP Draft; R1-166861 SPUCCH Design for CSI Feedback With Shortened TTI Length, 3rd Generation Partnership Project (3GPP), Mobile Competence Centre; 650, Route Des Lucioles ; F-06921 Sophia-Antipolis, vol. RAN WG1, No. Gothenburg, Sweden; Aug. 22-26, 2016, Aug. 13, 2016.
Santos, PCT International Search Report, International Application No. PCT/US2017/054188, European Patent Office, Rijswijk, NL, dated Dec. 19, 2017.
Chu, Notice of References Cited, U.S. Appl. No. 15/717,921, U.S. Patent and Trademark Office, filed Jan. 10, 2019.
Cho, Notice of References Cited, U.S. Appl. No. 15/717,926, U.S. Patent and Trademark Office, filed Nov. 27, 2018.
Chu, Notice of References Cited; U.S. Appl. No. 15/717,921, U.S. Patent and Trademark Office, filed May 15, 2019.
Ajid, Notice of References Cited, U.S. Appl. No. 15/717,906, U.S. Patent and Trademark Office, filed May 23, 2019.
Chu, Notice of References Cited, U.S. Appl. No. 15/717,921, U.S. Patent and Trademark Office, filed Aug. 19, 2019.
Ajid, Notice of References Cited, U.S. Appl. No. 15/717,906, U.S. Patent and Trademark Office, filed Mar. 30, 2020.

* cited by examiner

METHOD AND APPARATUS FOR REPORTING CHANNEL STATE INFORMATION

BACKGROUND

1. Field

The present disclosure is directed to a method and apparatus for reporting channel state information.

2. Introduction

Presently, wireless communication devices, such as user equipment communicate with other communication devices using wireless signals. In current Third Generation Partnership Project Long Term Evolution (3GPP LTE) systems, time-frequency resources are divided into 1 ms subframes where each 1 ms subframe includes two 0.5 ms slots and each slot with normal Cyclic Prefix (CP) duration comprises 7 Single Carrier Frequency Division Multiple Access (SC-FDMA) symbols in the time domain in Uplink (UL) and 7 Orthogonal Frequency Division Multiplexed (OFDM) symbols in the time domain in Downlink (DL). In the frequency domain, resources within a slot are divided into Physical Resource Blocks (PRBs), where each PRB spans 12 contiguous subcarriers.

In current LTE systems, resources are usually assigned using a 1 ms minimum Transmission Time Interval (TTI) when data is available, referred to as dynamic scheduling. Within each scheduled TTI, in UL, a wireless communication device, otherwise known as a User Equipment (UE), transmits data over a Physical Uplink Shared Channel (PUSCH) or a Physical Sidelink Shared Channel (PSSCH) in PRB-pairs indicated by an uplink/sidelink grant that schedules the data transmission to the UE. In DL, an enhanced NodeB (eNB), such as a base station, transmits data over a Physical Downlink Shared Channel (PDSCH) in PRB-pairs indicated by a DL grant/assignment. The UL/sidelink grant and/or DL assignment information is provided to the UE in a control channel, referred to as a Physical Downlink Control Channel (PDCCH) or enhanced PDCCH (EPDCCH). The (E)PDCCH channel carries the control information about the data being transmitted on the current subframe and the information about the resources which UE needs to use for the uplink/sidelink data.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and do not limit its scope. The drawings may have been simplified for clarity and are not necessarily drawn to scale.

DETAILED DESCRIPTION

Figure 1:
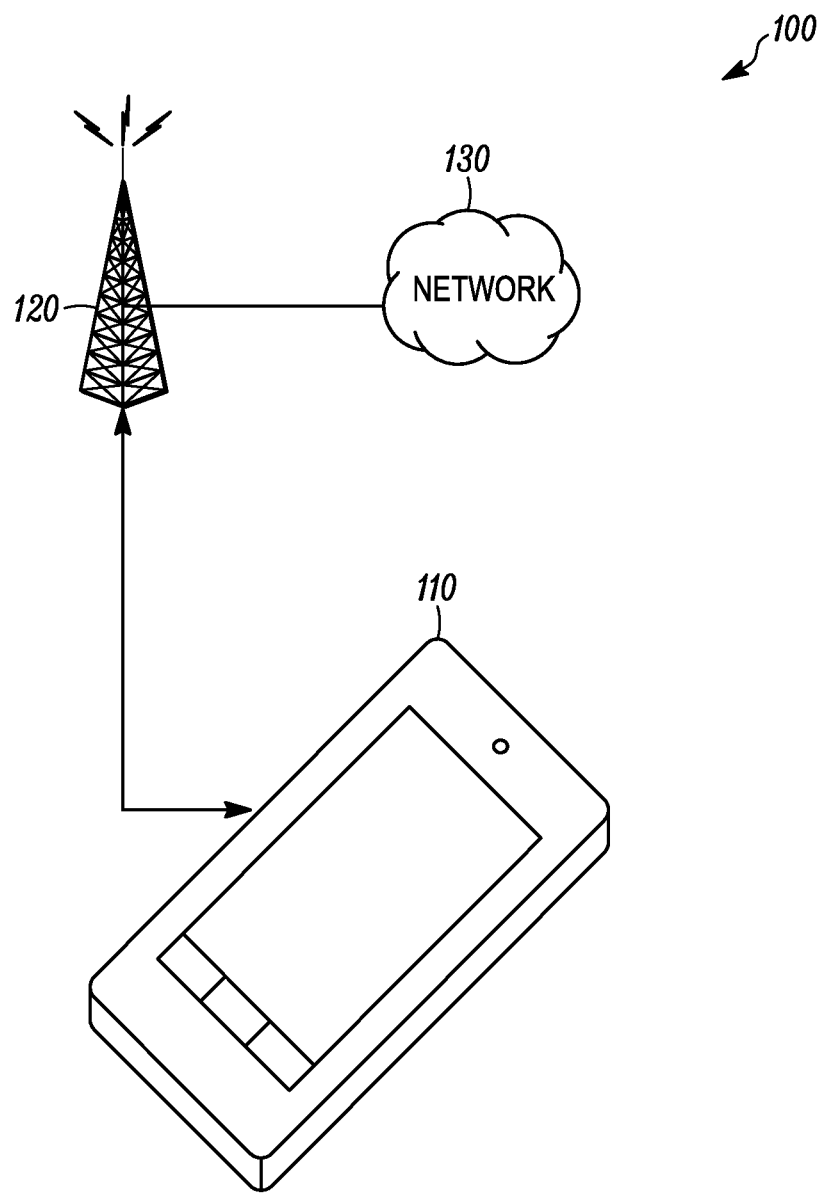
FIG. 1 is an example block diagram of a system according to a possible embodiment.

According to a possible embodiment, a channel state information request requesting a device to feedback channel state information can be received. Whether the channel state information request corresponds to regular latency based operation or reduced latency based operation can be determined. Channel state information can be derived based on a first reference resource when the channel state information request corresponds to regular latency based operation. Channel state information can be derived based on a second reference resource when the channel state information request corresponds to reduced latency based operation. The reduced latency based operation can have a latency less than the regular latency based operation. The derived channel state information can be reported to a network.

According to a possible embodiment, an indication can be received at a device from a network. The indication can request the device to feedback channel state information corresponding to a first transmit time interval length operation and/or a second transmit time interval length operation. When the indication requests channel state information feedback for the first transmit time interval length operation: a first reference transmit time interval of a first transmit time interval length can be determined based on the transmit time interval in which the indication is received; and a channel measurement to compute the channel state information can be derived using reference signals associated with the first reference transmit time interval, and/or an interference measurement to compute the channel state information can be derived using measurements made on resource elements associated with the first reference transmit time interval. When the indication requests channel state information feedback for the second transmit time interval length operation: a second reference transmit time interval of a second transmit time interval length can be determined based on the transmit time interval in which the indication is received; and a channel measurement to compute the channel state information can be derived using reference signals associated with the second reference transmit time interval, and/or an interference measurement to compute the channel state information can be derived using measurements made on resource elements associated with the second reference transmit time interval.

According to a possible embodiment, a configuration that configures a plurality of control decoding candidates can be received. A first set of the plurality of control decoding candidates associated with a first set of aggregation levels in a first transmit time interval of a subframe can be monitored. A second set of the plurality of control decoding candidates associated with a second set of aggregation levels in a second transmit time interval of the subframe can be monitored. The first of the plurality of control decoding candidates and the second set of the plurality of control decoding candidates can be different at least in one control decoding candidate. The first set of aggregation levels can be different than the second set of aggregation levels.

According to a possible embodiment, a first set of control decoding candidates corresponding to a first transmit time interval length in a subframe can be monitored when a device is not configured to communicate using a second transmit time interval length in the subframe. The second transmit time interval length can be shorter than the first transmit time interval length. A second set of control decoding candidates corresponding to the first transmit time interval length in the subframe can be monitored when the device is configured to communicate using the second transmit time interval length in the subframe. The first and the second sets can be different. A number of candidates in the second set can be less than a number of candidates in the first set.

FIG. 1 is an example block diagram of a system 100 according to a possible embodiment. The system 100 can include a wireless communication device 110, such as a User Equipment (UE), a base station 120, and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks. In operation, the wireless communication device 110 can communicate with the base station 120 using wireless communication signals. These signals can include control and data signals.

Some embodiments can provide a UE procedure for reporting Channel State Information (CSI) for reduced latency. In DL cellular communication systems, the quality of the signal received by a UE depends on the Signal-to-Interference-and-Noise Ratio (SINR), which can include three elements: (1) channel quality between a serving cell of a base station and the UE, (2) the level of interference, such as from other cells, and (3) the noise level. The UE's receiver capability in handling the interference, such as via interference cancellation, also plays a role in the signal quality. In DL LTE, the eNB, such as the base station 120, can adapt modulation and coding rate, referred to as Modulation and Coding Scheme (MCS), for a UE based on prediction of the downlink channel conditions. A Channel Quality Indicator (CQI) feedback sent by the UE in the Uplink (UL) is an input to the adaptation. The typical time between the UE's measurement of the downlink reference signals and the subframe containing the correspondingly adapted downlink transmission on the Physical Downlink Shared Channel (PDSCH) is typically 7-8 ms, which as equivalent to a UE speed of ~16 km/h at 1.9 GHz.

CQI feedback is an indication of the data rate that can be supported by the channel between the UE and the eNB, taking into account SINR and the UE's receiver capability, such as in handling the interference. For CQI, the UE reports the highest MCS, such as from a set of possible MCS indices, that it can decode with a BLock Error Rate (BLER), computed on the transport blocks, probability not exceeding 10%. The CQI derivation, such as the BLER calculation can be done based on a CSI reference resource as follows: A single PDSCH transport block with a combination of modulation scheme and transport block size corresponding to the CQI index shown in Tables 1-4, and occupying a group of downlink physical resource blocks termed the CSI reference resource, can be received with a transport block error probability not exceeding 0.1.

TABLE 1

4-bit CQI Table

| CQI index | modulation | code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

4-bit CQI Table 2

| CQI index | modulation | code rate × 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 3

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | reserved |
| 30 | 4 | |
| 31 | 6 | |

TABLE 4

Modulation and TBS index table 2 for PDSCH

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33/33A |
| 28 | 2 | reserved |
| 29 | 4 | |
| 30 | 6 | |
| 31 | 8 | |

In LTE, the CSI reference resource for a serving cell can be defined as follows: In the frequency domain, the CSI reference resource can be defined by the group of downlink physical resource blocks corresponding to the band to which the derived CQI value relates. In the time domain, for a UE configured in transmission mode 1-9 or transmission mode 10 with a single configured CSI process for the serving cell, the CSI reference resource can be defined by a single downlink or special subframe n-nCQI_ref, assuming CSI report in UL subframe "n", where for periodic CSI reporting nCQI_ref is the smallest value greater than or equal to 4, such that it corresponds to a valid downlink or valid special subframe, where for aperiodic CSI reporting, if the UE is not configured with the higher layer parameter csiSubframePatternConfig-r12, nCQI_ref is such that the reference resource can be in the same valid downlink or valid special subframe as the corresponding CSI request in an uplink Downlink Control Information (DCI) format. Other conditions can also exist in the 3GPP Technical Specification for CQI-ReportConfig. If there is no valid downlink or no valid special subframe for the CSI reference resource in a serving cell, CSI reporting can be omitted for the serving cell in uplink subframe n. In the layer domain, the CSI reference resource can be defined by any Rank Indicator (RI) and Precoding Matrix Index (PMI) on which the CQI is conditioned.

In the CSI reference resource, the UE can assume the following for the purpose of deriving the CQI index, and if also configured, PMI and RI: The first 3 OFDM symbols are occupied by control signaling; No resource elements used by primary or secondary synchronization signals or Physical Broadcast Channel (PBCH) or EPDCCH; CP length of the non-Multicast-Broadcast Single-Frequency Network (MBSFN) subframes; Redundancy Version 0; If CSI Reference Signal (CSI-RS) is used for channel measurements, the ratio of PDSCH Energy Per Resource Element (EPRE) to CSI-RS EPRE is as given in 3GPP Technical Specification No. 36.213, sub clause 7.2.5. The UE can also assume for transmission mode 9 CSI reporting: Cell-specific Reference Symbol (CRS) REs are as in non-MBSFN subframes; If the UE is configured for PMI/RI reporting or without PMI reporting, the UE-specific reference signal overhead is consistent with the most recent reported rank if more than one CSI-RS port is configured, and is consistent with rank 1 transmission if only one CSI-RS port is configured; Additional assumptions can be made in accordance with 3GPP Technical Specification (TS) No. 32.213, section 7.2.3.

For transmission mode 10 CSI reporting, if a CSI process is configured without PMI/RI reporting: Depending on the number of antenna ports of the associated CSI-RS resource, if CRS REs are as in non-MBSFN subframes, the CRS overhead can be assumed to be the same as the CRS overhead corresponding to the number of CRS antenna ports of the serving cell; otherwise, the overhead of CRS REs can assume the same number of antenna ports as that of the associated CSI-RS resource. Additional assumptions can be made in accordance with 3GPP Technical Specification No. 32.213, section 7.2.3.

For transmission mode 10 CSI reporting, if a CSI process is configured with PMI/RI reporting or without PMI reporting: CRS REs can be as in non-MBSFN subframes. The CRS overhead can be assumed to be the same as the CRS overhead corresponding to the number of CRS antenna ports of the serving cell. Additional assumptions can be made in accordance with 3GPP Technical Specification No. 32.213, section 7.2.3.

In LTE, A combination of modulation scheme and transport block size can correspond to a CQI index if: the combination could be signaled for transmission on the PDSCH in the CSI reference resource according to the relevant Transport Block Size table, the modulation scheme can be indicated by the CQI index, and the combination of transport block size and modulation scheme when applied to the reference resource results in the effective channel code rate which can be the closest possible to the code rate indicated by the CQI index. If more than one combination of transport block size and modulation scheme results in an effective channel code rate equally close to the code rate indicated by the CQI index, only the combination with the smallest of such transport block sizes may be relevant.

For CSI reporting in LTE, in LTE, there can be two reporting modes in the time domain: periodic reporting where the UE reports CQI, PMI, and RI with reporting periods configured by the higher layer. PUCCH can be used for this and aperiodic reporting, which can be used to provide large and more detail reporting in a single reporting instance via PUSCH. Report Timing can be triggered by DCI.

For subbandCQI feedback, in periodic reporting, The UE can cycle through different subbands from one reporting instance to the next, to reduce overhead and the number of bands across the system BW is a configuration parameter. In aperiodic reporting, for higher layer configured subband reporting, the UE can report the subbandCQI for each band in a single feedback report, and for a UE selected subband report, the UE can report the subbandCQI for the 'M' bands with the highest CQI values.

Figure 2:
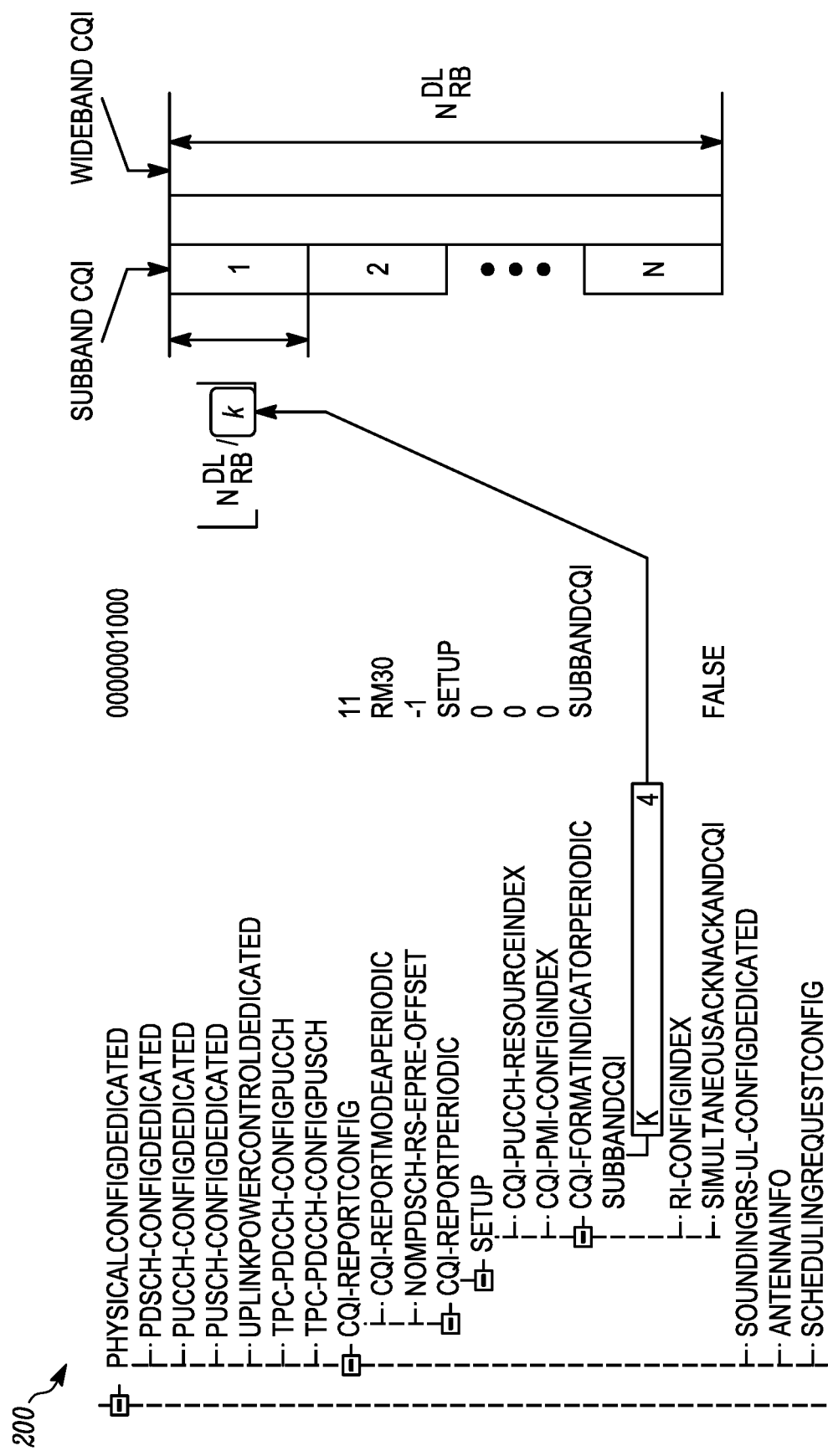
FIG. 2 is an example of subband configuration for CQI reporting in LTE according to a possible embodiment.

FIG. 2 is an example of subband configuration 200 for CQI reporting in LTE according to a possible embodiment. The set of subbands (S) a UE can evaluate for CQI reporting can span the entire downlink system bandwidth. A subband is a set of k contiguous PRBs, where k can be a function of system bandwidth. Note that the last subband in set S may have fewer than k contiguous PRBs depending on $N_{RB}^{DL}$. The number of subbands for system bandwidth given by $N_{RB}^{DL}$ can be defined by $N=\lceil N_{RB}^{DL}/k \rceil$. The subbands can be indexed in the order of increasing frequency and non-increasing sizes starting at the lowest frequency.

To reduce latency of communication in LTE, shorter minimum TTI, such as shorter than 1 ms, may be used in UL/DL. Using a shorter minimum TTI (sTTI) can allow the UE to send/receive data using reduced latency when compared to current LTE systems. In addition, acknowledging each, or a group containing few, sTTI(s) leading to faster, compared to using 1 ms TTI, acknowledging data can help in some applications such as Transmission Control Protocol (TCP) during slow-start phase for users in good channel conditions. For example, in the TCP slow-start phase for DL communication, the network-UE link capacity for a user in good channel condition can support more data, but the network sends a smaller amount of data because the network is waiting to receive the acknowledgment for the previously sent data due to the TCP slow-start phase. Therefore, faster acknowledgments, such as from a result of using shorter TTI length, can enable the network to better utilize the available network-UE link capacity.

For example, scheduling UE transmission over a sTTI length of 0.5 ms, such as PUSCH scheduled using a PRB spanning a 0.5 ms in a 1 ms subframe, or scheduling UE transmission over a sTTI length of ~140 us, such as PUSCH scheduled using a shortened PRB spanning 2 SC-FDMA symbols within a slot in a subframe, may not only reduce time taken to start/finish transmitting a data packet, but also can reduce the round trip time for possible Hybrid Automatic Repeat reQuest (HARQ) retransmissions related to that data packet.

The PDCCH channel can carry the control information about the data being transmitted on the current subframe and the information about the resources which UE need to use for the uplink data. That means it can be mandatory for the UE to decode it successfully if the UE wants to send some data or receive something. For reduced latency a shortened PDCCH (sPDCCH) can be defined to play a similar role in a sTTI or a group of sTTIs. For PDCCH, allocation of resources can happen in terms of Control Channel Elements (CCEs) which can each be equivalent to 36 REs. One CCE can be the minimum PDCCH allocation unit.

As the sTTI length becomes smaller, the control overhead can increase, which in turn can increase the complexity and hence the processing delay, which may negatively impact the latency reduction offered by low-latency operation. To allow multiplexing of non-sTTI and sTTI it can be assumed that from eNB perspective, existing non-sTTI and sTTI can be Frequency Division Multiplexed (FDMed) in the same subframe in the same carrier.

To achieve the potentials of shortened TTI operation, if the CSI report for sTTI scheduling can be also provided fast enough to the eNB, better adaptation to the channel condition can be possible. For example, better adaptation can include better channel fading, interference information, etc. Faster CSI, as compared to existing CSI reporting mechanisms, can help in reducing the latency of data transmission by better scheduling and utilizing the available channel capacity. For sTTI, the reporting period, such as the CSI reporting delay or periodic reporting period, can be shrunk. To reduce CSI feedback a larger subband size can be used for sTTI.

Figure 3:
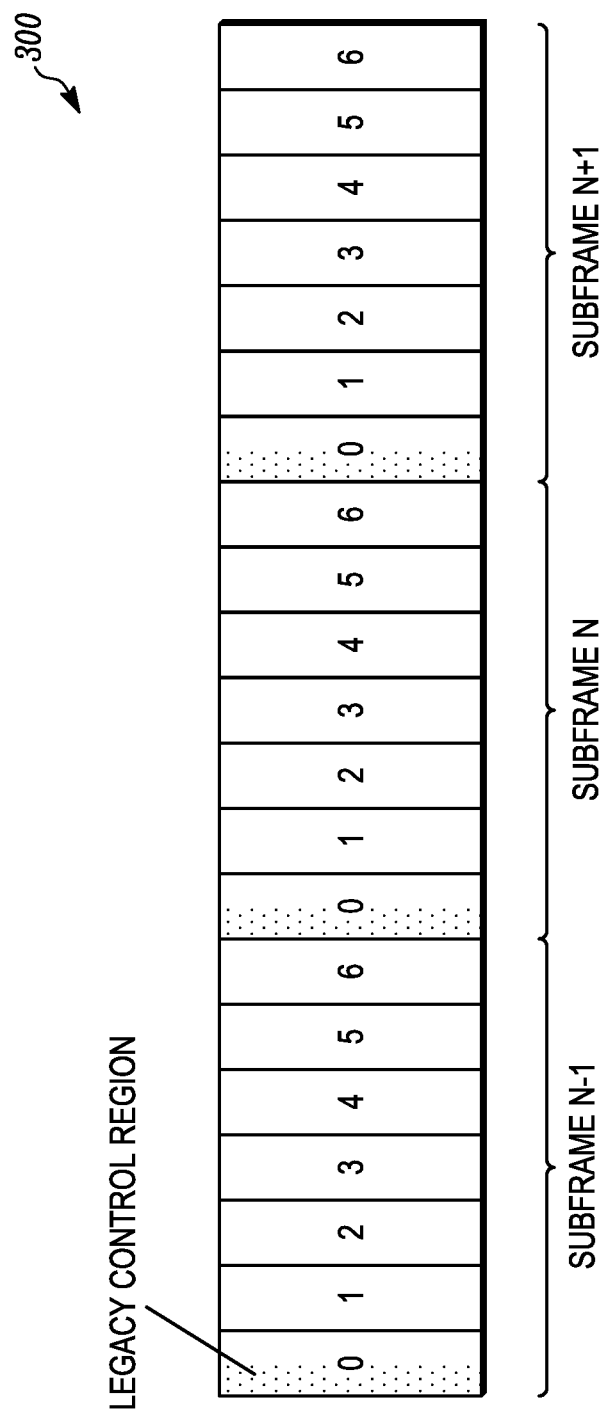
FIG. 3 is an example illustration of a sTTI and a regular TTI structure according to a possible embodiment.

FIG. 3 is an example illustration of a regular TTI, such as a 1 ms subframe length TTI, and a sTTI structure 300 according to a possible embodiment. As discussed above, the UE can be expected to look for control signaling that grants resources for either sTTI based transmission or a regular TTI based transmission, where regular TTI can sometimes also be referred to as 1 ms TTI. The control signaling itself may be received by the UE in a control channel of a sTTI, such as a sPDCCH sent in sTTI, or it may be received on a legacy control channel, such as a PDCCH in legacy control region or EPDCCH. If the control signaling includes a CSI request, the UE can include CSI information in the transmission granted by the control channel. How the UE computes included CSI information can depend on whether the CSI request corresponds to sTTI based operation (sCSI), or whether the CSI request corresponds to regular TTI based operation (rCSI).

For example, if the CSI request corresponds to sTTI based operation, the UE can derive the channel measurement to compute the CSI information using reference signals associated with the reference sTTI in which the CSI request is received. Similarly, the UE can derive the interference measurement to compute the CSI information using measurements made on resource elements associated with the reference sTTI in which the CSI request is received. If the CSI request corresponds to regular TTI based operation, the UE can use different reference signals and resource elements to make its channel and interference measurements. Regular TTI can typically be a subframe with 14 OFDM symbols and sTTI can be a time resource within the subframe with shorter duration, such as two (2) OFDM symbols. Some examples are discussed below using the structure 300.

In one example, if the UE receives a CSI request using a sPDCCH in sTTI1 of subframe n, the UE can use reference signals transmitted in the OFDM symbols corresponding to sTTI0, where sTTI0 can overlap with PDCCH, and sTTI1 of subframe n, and optionally reference signals received in previous subframes, such as subframe n−1, to derive its channel measurements. Here, since the CSI request is transmitted in a sTTI, the UE can implicitly assume that the CSI request is for sTTI based operation. In this case, sTTI1 can be considered as the reference sTTI.

In another example, if the UE receives a CSI request using a PDCCH in the legacy control region of subframe n, and if the PDCCH corresponds to sTTI operation, the UE can use reference signals transmitted in the OFDM symbols corresponding to sTTI0 of subframe n, or more generally, the sTTIs that overlap with the legacy control region, and optionally reference signals received in previous subframes, such as subframe n−1, to derive its channel measurements. Here, since the CSI request is transmitted in the legacy control region, the UE can determine whether the CSI request is for sTTI based operation or regular TTI based operation based on whether the PDCCH corresponds to sTTI operation or regular TTI operation respectively, such as based on using different Radio Network Temporary Identifier (RNTI) values used in Cyclic Redundancy Check (CRC) scrambling of PDCCHs of sTTI and regular TTI operation. In this case, sTTI0 can be considered as the reference sTTI.

In another example, if the UE receives a CSI request using an EPDCCH in subframe n, and if the EPDCCH corresponds to sTTI operation, the UE can use reference signals transmitted in the OFDM symbols corresponding to a subset of sTTIs of subframe n, such as, sTTI6 or sTTIs 5 and 6, and optionally reference signals received in previous subframes, such as subframe n−1, to derive its channel measurements. Here, since the CSI request is transmitted in the legacy control region, the UE can determine whether the CSI request is for sTTI based operation or regular TTI based operation based on whether the EPDCCH corresponds to sTTI operation or regular TTI operation respectively, such as based using different RNTI values used in CRC scrambling of PDCCHs of sTTI and regular TTI operation. In this case, sTTI6 can be considered as the reference sTTI.

In another example, if the PDCCH carrying the CSI request corresponds to regular TTI based operation, the UE can use reference signals transmitted until the end of subframe n, and optionally reference signals received in previous subframes, such as subframe n−1, to derive its channel measurements.

In another example, if the UE receives a CSI request using a sPDCCH in sTTI of subframe n, and if information decoded from the sPDCCH explicitly indicates that the CSI request is for regular TTI based operation, such as using a bit or code point in the DCI, the UE can use reference signals transmitted until the end of subframe n, and optionally reference signals received in previous subframes, such as subframe n−1, to derive its channel measurements.

In the above examples, the reference signals used by the UE for deriving the channel measurements may have different configurations across the system bandwidth or sTTIs of a subframe or across different subframes. For instance, CSI-RS for a portion of system bandwidth can belong to sTTI operation and CSI-RS for anther portion can belong to regular TTI operation. The UE can use CSI-RS signals in both system bandwidth portions for deriving channel measurements in response to the CSI request corresponding to the regular TTI-based operation or the sTTI-based operation.

The number of reference signals the UE may use for channel measurement may be restricted by higher-layer configuration. For example, the UE may only use reference signals in reference sTTI or reference signals in the subframe up to the reference sTTI. This may be the case for CRS reference signals. For CSI-RS reference signals, the UE may only use the most recent reference signals, no later than the reference sTTI.

While the above examples discuss the reference signals that the UE can use for deriving channel measurements, similar approaches to those described above can also be used by the UE for determining resource elements for deriving interference measurements used in the CSI computation. The interference measurement may be based on CRS reference signals or CSI-IM resources.

The CSI information reported by the UE typically includes a CQI index. Typically, the UE derives a highest possible CQI index such that a single transport block with a combination of modulation scheme and transport block size corresponding to the CQI index, such as using a table similar to the ones described above, can be received with a transport block error probability not exceeding 0.1. The channel and interference measurements described above derived by the UE can help the UE to identify the appropriate highest possible CQI index satisfying the above criterion. For the block error probability computation the UE can assume a CSI reference resource.

If the CSI request corresponds to sTTI based operation, the UE can assume a CSI reference resource corresponding to sTTI operation. Alternately, if the CSI request corresponds to regular TTI based operation, the UE can assume a CSI reference resource corresponding to regular TTI operation. Allowing the UE to assume different types of CSI resources for regular and sTTI based operation can improve the accuracy of CSI information transmitted by the UE. For example, if the CSI request corresponds to sTTI based operation, the CSI reference resource can correspond to a reference sTTI in the time domain, where examples of reference sTTI are described above, and a set of PRBs within the reference sTTI in the frequency domain. If the CSI request corresponds to regular TTI operation, the CSI reference resource can correspond to a reference subframe in the time domain and a set of PRBs within the reference subframe in the frequency domain. The duration of a sTTI corresponding to a duration of 2 or 7 OFDM symbols can be smaller than the duration of a subframe corresponding to a duration of 14 OFDM symbols. Also, the set of PRBs within the reference sTTI can be different from the PRBs within the reference subframe. More details on CSI reference resource for sTTI based operation as described in later sections below.

The rank of the channel may not change between regular TTI and sTTI operation. Thus, in some examples, the UE may assume for sTTI CSI computation, the rank can be the same as the rank of the most recent RI reported for regular TTI. This may help with reducing the sTTI CSI computation complexity. The regular TTI and sTTI CSI configurations may be in the same CSI process. In some cases, the UE may be explicitly configured with a RI-reference regular TTI CSI process, such as a sTTI CSI process, to use for sTTI operation. This may be case when regular TTI and sTTI CSI are independently configured in different CSI processes. The set of restricted RIs with precoder codebook subset restriction may be same for sTTI and regular TTI CSI. The CSI reporting mode may support RI reporting for regular TTI CSI. In some examples, the wideband CQI for sTTI operation may be encoded differentially, such as 1 or 2-bit, with respect to most recent wideband CQI reported for regular TTI operation to help with reducing the feedback overhead. This may be useful when CSI for both regular TTI and sTTI are reported at the same time. For example, wideband differential CQI sTTI offset level=sTTI wideband CQI index−regular TTI wideband CQI index with an example 1-bit mapping shown in Table 5 below:

TABLE 5

Mapping wideband differential CQI value to offset level

| wideband differential CQI sTTI offset level | Offset level |
| --- | --- |
| 0 | 0 |
| 1 | −1 |

The UE can monitor PDCCH or sPDCCH candidates which may carry the CSI trigger. The UE can be configured to monitor sPDCCH candidates carrying sDCI, which may trigger the sCSI report, over multiple sets of RBs.

Figure 4:
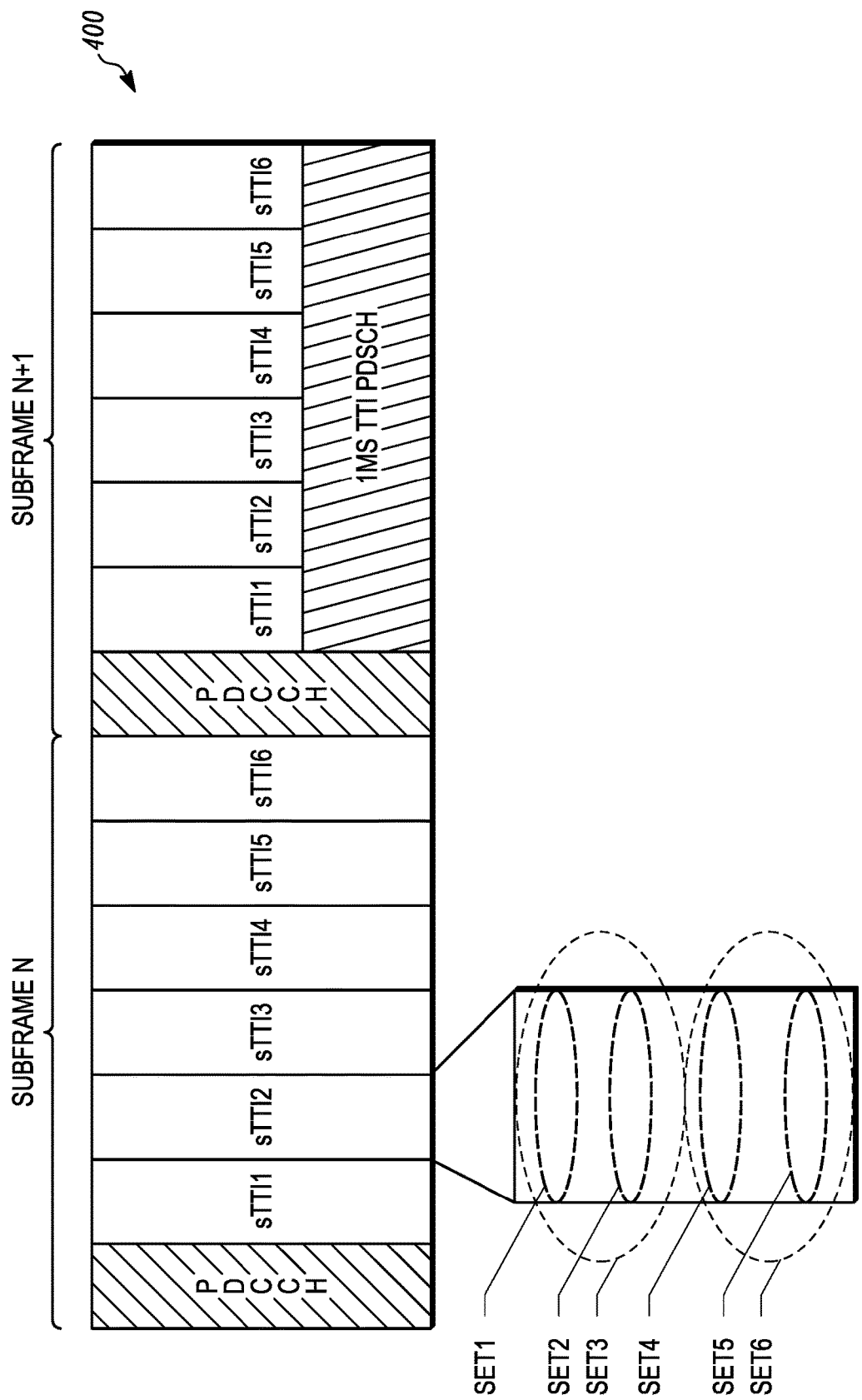
FIG. 4 is an example illustration of multiple-PRB set configuration for sPDCCH monitoring according to a possible embodiment.

FIG. 4 is an example illustration 400 of multiple-PRB set configuration for sPDCCH monitoring according to a possible embodiment. In each sTTI of a subframe where the UE is enabled for sTTI operation, the UE can monitor some or all of the configured PRB-sets. For the example shown in the illustration 400, the eNB can configure 6 PRB-sets for sPDCCH control monitoring. Subframe n+1 has a legacy PDSCH allocation overlapping some sPDCCH monitoring sets, such as 4, 5, 6, however, the eNB can use the remaining sets, such as 1, 2, 3, to schedule sPDSCH in that subframe.

Figure 5:
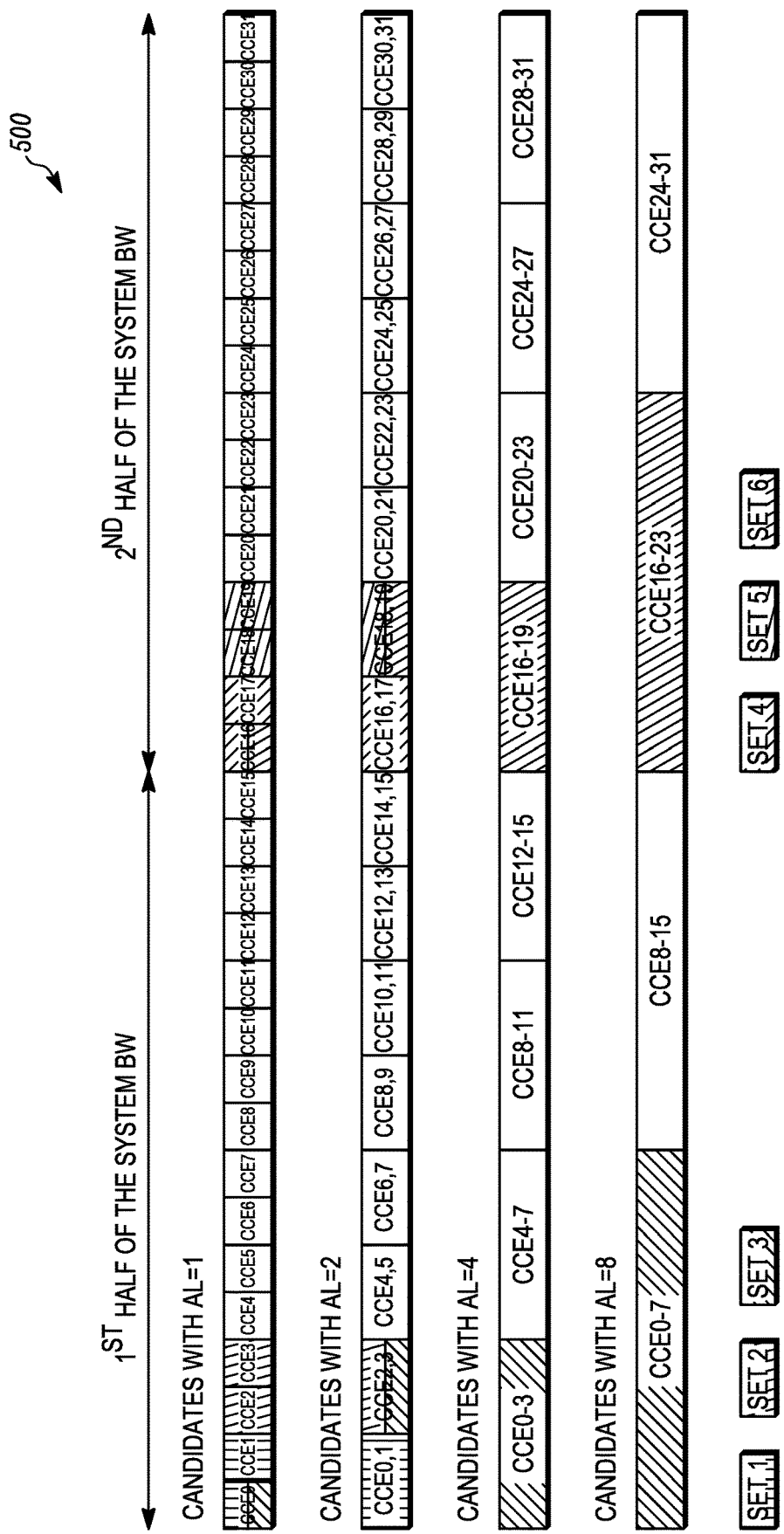
FIG. 5 is an example illustration of sPDCCH decoding candidates belonging to different PRB-sets according to a possible embodiment.

FIG. 5 is an example illustration 500 of sPDCCH decoding candidates belonging to different PRB-sets according to a possible embodiment, where different PRB sets are represented by different hashing. Set 3 includes some of the decoding candidates belonging to sets 1 and 2. Set 6 includes some of the decoding candidates belonging to sets 4 and 5. To get frequency diversity, in a 2-symbol TTI, CCEs of the first three sets can be mapped within the first half of the system BW, and CCEs of the second three sets can be mapped within the second half of the system BW.

Different PRB-sets for sPDCCH monitoring can have different bandwidths, different numbers of decoding candidates, and may support different Aggregation Levels (AL). For instance, as shown in the illustration 500, each of sets 1, 2, 4, 5 from the illustration 400 may include two decoding candidates with AL=1, and one decoding candidate with AL=2 taking about 3 RBs assuming 36 REs/CCE; whereas sets 3 and 6 may have one candidate with AL=4 and one candidate with AL=8 in addition to the one candidate with AL=1 and one candidate with AL=2, taking about 12 RBs.

Among different sTTIs of a subframe, the sets to be monitored in each sTTI can change with sTTI index within the subframe to provide more flexible sPDCCH scheduling. For instance, assuming 6 sTTIs with sPDCCH candidates in a subframe, sets (1,6); (3,4); (2,6); (3,5); (1,6); (3,4); can be monitored in the sTTIs 1, 2, 3, 4, 5, 6 respectively of the subframe. For instance, sets (1,6) correspond to CCE0,1,16-23 and sets (3,4) correspond to CCE0-7, 16, 17. More generally, the UE can be configured with multiple sets, such as via higher layer signaling, to monitor sPDDCH candidates. For each sTTI in which sPDCCH candidates are monitored, the UE can determine a subset of sets from the multiple configured sets based on one or more of the following parameters: UE identifier, subframe index corresponding to the sTTI, sTTI index, and/or slot index corresponding to the sTTI. The UE can then monitor sPDCCH candidates belonging to the subset of sets for receiving sPDCCH in the sTTI.

Increasing the number of sPDCCH PRB-sets can increase sPDCCH scheduling flexibility. If a large number of PRB-sets is needed, the eNB may limit the number of sets to be monitored in a subframe. Even if the UE misses the eNB indication of set limitation, the UE can monitor a default PRB-set to monitor sPDCCH candidates in a subframe. The default set can overlap with most of the configured PRB-sets to increase the sPDCCH scheduling flexibility. For instance, in the example above, a default set can be made of one candidate with each of the aggregation levels 1, 2, 4, and 8 belonging to the different PRB-sets. For example, in odd sTTIs of the subframe, the default set can contain 4 sPDCCH decoding candidates: CCE0 for AL=1, CCE16, 17 for AL=2, CCE0-3 for AL=4, and CCE16-23 for AL=8, and for even sTTIs of the subframe, the default set can contain CCE16 for AL=1, CCE0, 1 for AL=2, CCE16-19 for AL=4, and CCE0-7 for AL=8.

Assuming 4-6 Blind Decodes (BDs) per sTTI as considered in the examples given above, and considering 6 sTTIs in a subframe with sPDCCH decoding candidates, such as 2 sTTIs in the first slot and 4 sTTIs in the second slot, there can be 24-36 additional BDs needed per subframe. Noting that not all of the sPDCCH BDs need to be processed at the same time, as they occur in different sTTIs of the subframe, the resulting processing delay due to the additional BDs may be negligible or tolerable. For example, the following assumes 32 PDCCH BDs, such as in the first two OFDM symbols of a subframe, can be processed by the end of the first slot in the subframe, and also assumes there is no additional hardware for processing the BDs due to the sTTI operation. In that case, if all of the sPDCCH decoding candidates would have happened at the sTTIs of the second slot, up to 32 of them could have been processed using the unoccupied BD processing unit. However, some of the sPDCCH decoding candidates belong to the sTTIs of the first slot, such as 8-12 BDs in our examples. For those BDs, since there is no additional hardware, they may need to wait until the PDCCH decoding candidates are processed. To avoid additional processing delay for those 8-12 BD candidates, the number of PDCCH BD candidates can be reduced from 32 to 24 or 20. If more than 20-24 PDCCH BD candidates are needed, the number of sPDCCH BDs in the first slot can be reduced. For example, in the examples given above, the UE can monitor only PRB-set 1 in sTTIs of the first slot. In such a case, 28 PDCCH BDs, and only 2 BDs per sTTI in the first slot may be possible.

One step in designing a CSI report can be to define a CSI reference resource discussed above. Throughout this disclosure, a CSI reported for sTTI operation can be referred to as an sCSI. To define an sCSI-reference resource, some considerations can be made with respect to the definition of the CSI-reference resource for 1 ms-TTI.

One consideration can be that each 1 ms-TTI, such as regular TTI or subframe, can comprise multiple sTTIs, which can have different characteristics related to the sCSI reference resource. For example, for slot-level sTTI, such as an sTTI spanning 7 OFDM symbols in a subframe: the first slot in a subframe can contain PDCCH symbols which are not present in the second slot sTTI in the subframe. For 2-symbol-sTTIs, such as an sTTI spanning 2 OFDM symbols in a subframe: some of the 2 symbol sTTIs in a subframe may not contain CRS REs whereas some of the sTTIs in the subframe may contain CRS REs.

Another consideration can be UE-specific overhead in CSI-reference resource. Note that in the following design methodology of LTE for TM9 for 1 ms-TTI, if the UE is configured for PMI/RI reporting or without PMI reporting, the UE-specific reference signal overhead can be consistent with the most recent reported rank if more than one CSI-RS port is configured, and can be consistent with rank 1 transmission if only one CSI-RS port is configured. Also, note that in sTTI and 1-ms TTI, UE-specific reference signal REs can be different, such as in terms of location and quantity per sTTI. Additionally, note that to save UE-specific reference signal overhead for sTTI operation, not all sTTIs may contain the reference signal. Further, note that sCSI may not include sRI, and for rank information, the eNB may rely on the most recent RI reported, such as for 1 ms operation, for the purpose of sTTI scheduling, subject to a possible rank restriction, such as where ranks higher than 4 may not be possible in an sTTI, whereas ranks up to 8 can be possible for a subframe. Also, note that different number of CSI-RS and sCSI-RS ports may be configured for the UE.

Another consideration can be the case of system Bandwidth (BW) split between sTTI UEs and regular 1-ms TTI UEs. In the present disclosure the BW portion given to the sTTI UEs can be referred to as sBW and the BW portion given to the regular UEs can be referred to as rBW. The existing CSI-reference resource can be defined by the group of DL PRBs corresponding to the band to which the derived CQI value relates. In LTE, the UE can select the highest CQI index that satisfies the condition: A single PDSCH TB with a combination of modulation scheme and TBS corresponding to the CQI index in the CSI reference resource could be received with a TB BLER not exceeding 0.1. For sTTI operation, the band to which the derived sCQI value relates can be a function of the sBW. For instance, a wideband sCQI may be derived only over a part of the system BW, such as the sBW, at the time of sCQI derivation or the wideband sCQI may be derived only over an average/typical/maximum/minimum sBW value.

Figure 6:
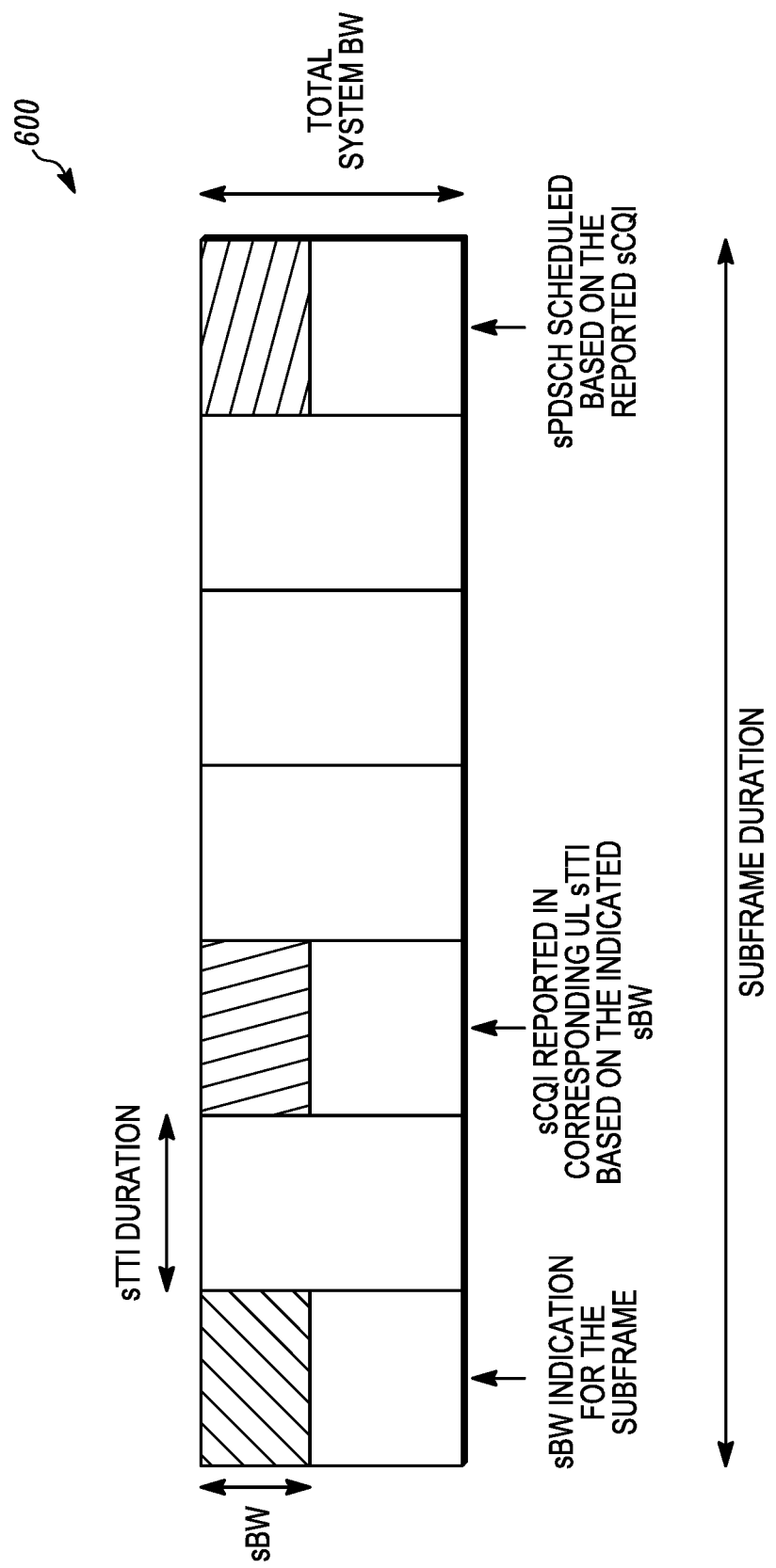
FIG. 6 is an example illustration of a subframe duration for using an sBW value in deriving sCQI and using the sCQI to schedule sPDSCH in a subframe containing 2-symbol sTTIs according to a possible embodiment.

FIG. 6 is an example illustration of a subframe duration 600 for using an sBW value in deriving sCQI and using the sCQI to schedule sPDSCH in a subframe containing 2-symbol sTTIs according to a possible embodiment. At the beginning of the subframe, an eNB may trigger an aperiodic sCSI report. If scheduling timing allows for derivation and reporting, and also possibly triggering the report, of sCQI in a subframe, and scheduling of an sPDSCH in the same subframe according to the reported sCQI, the sCQI reference resource can be determined based on the sBW value indicated at the beginning of the subframe. Note that if the BW split is the same for multiple consecutive subframes, such as two subframes, the same approach of having the band to which the derived sCQI value relates as a function of the sBW, can be feasible.

In the sCSI reference resource, the UE can assume the following implementations for the purpose of deriving the sCQI index, and if also configured, sPMI and sRI. According to a first possible approach for slot-level TTI, the first x, such as 2, OFDM symbols of the slot can be occupied by control signaling. No resource elements may be used by primary or secondary synchronization signals or PBCH or EPDCCH. The non-MBSFN subframes can have CP length. The Redundancy Version can be 0. If CSI-RS is used for channel measurements, the ratio of sPDSCH Energy Per Resource Element (EPRE) to sCSI-RS EPRE can be as given in TS 36.213, sub clause 7.2.5. For transmission mode 9 CSI reporting where CRS REs are as in non-MBSFN subframes, if the UE is configured for PMI/RI reporting or without PMI reporting, the UE-specific reference signal overhead can be consistent with the most recent reported rank, subject to a possible maximum rank restriction for sTTI, if more than one CSI-RS port is configured, and can be consistent with rank 1 transmission if only one CSI-RS port is configured. Having x, such as 2, OFDM symbols of the slot in the first approach can account for the sPDCCH as well, if 2 symbol sPDCCH for slot-level used. This design along with the current 3GPP agreements of legacy PDCCH can be used to transmit sDCI, such as DCI for sPDSCH and/or sPUSCH, and for CRS-based sPDCCH, sPDCCH may not be mapped to the PDCCH region, since, the first slot can carry PDCCH and the second slot can carry sPDCCH.

In the first approach, the derived sCQI can be equally applicable for scheduling the first slot and the second slot in a subframe. An alternative to the first approach can be to keep the existing assumption of the 3 OFDM symbols of PDCCH in LTE for CSI-reference resource, but now in a slot instead of a subframe. According to a second possible approach for slot-level TTI, the first 3 OFDM symbols of the slot can be occupied by control signaling.

Figure 7:
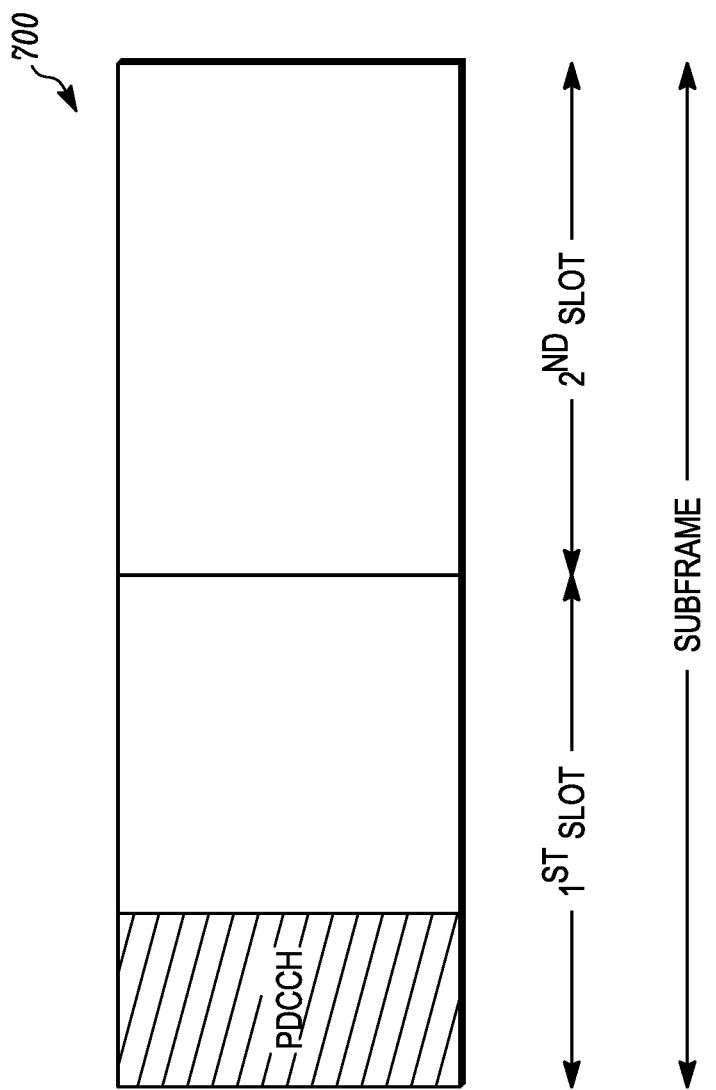
FIG. 7 is an example illustration of a subframe where the second slot in a TTI does not contain PDCCH symbols according to a possible embodiment.

FIG. 7 is an example illustration of a subframe 700 where the second slot in a TTI does not contain PDCCH symbols according to a possible embodiment. Based on the sCQI-reference resource definition, an eNB may choose a higher MCS index corresponding to the reported sCQI index. For example, there may not be whole symbols allocated to the sPDCCH region, such as when only some RBs and not the whole BW may be allocated for sPDCCH. In this case, since the second slot in each subframe does not have any PDCCH symbols, depending on the selected sCSI-reference resource, such as an assumption on the number of OFDM symbols for PDCCH, the eNB may need to take into account some adjustment with respect to reported CQI, depending on which slot, such as the first slot in the subframe or the second slot in the subframe, the eNB schedules an sPDSCH transmission. Another approach can be for the UE to report two sCQI types: one assuming a certain number, x, of PDCCH symbols in a slot, and another one assuming no PDCCH symbols in a slot.

As an example, if the sCSI-reference resource assumes 3 OFDM symbols for PDCCH, when eNB schedules the first slot in a subframe based on the reported sCQI, the eNB may choose the corresponding MCS index to the reported sCQI index. When the eNB schedules the second slot in a subframe based on the reported sCQI, the eNB may choose a slightly higher MCS index corresponding to the reported sCQI index. Alternatively, the MCS index table may not be changed, but a fixed or signaled offset can be assumed/indicated by/to the UE if the second slot in the subframe is scheduled.

As another implementation in the sCSI reference resource, the UE can assume the following for the purpose of deriving the sCQI index, and if also configured, sPMI and sRI, for 2-symbol-level TTI. No resource elements may be used by primary or secondary synchronization signals or PBCH or EPDCCH. The non-MBSFN subframes can have CP length. The Redundancy Version can be 0. If CSI-RS is used for channel measurements, the ratio of sPDSCH EPRE to sCSI-RS EPRE can be as given in 36.213, subclause 7.2.5. For transmission mode 9 CSI reporting, CRS REs can be as in non-MBSFN subframes in a 2-symbol TTI containing CRS REs and if the UE is configured for PMI/RI reporting or without PMI reporting, the UE-specific reference signal overhead can be consistent with the most recent reported rank, subject to a possible maximum rank restriction for sTTI, if more than one CSI-RS port is configured, and can be consistent with rank 1 transmission if only one CSI-RS port is configured;

To efficiently utilize the sTTI resources according to the sCQI feedback(s), in a first approach if the first, and possibly the second, 2-symbol TTI(s) in a subframe can include the PDCCH control symbols, then eNB may use a lower MCS index than the one derived from the sCQI reported by the UE based on the above design. If a 2-symbol TTI that the eNB schedules does not contain CRS REs, the eNB may choose a slightly higher MCS index or UE may get an MCS that has an offset to be indicated to the UE or to be assumed by the UE similar to the slot-level design above.

In a second approach to efficiently utilize the sTTI resources according to the sCQI feedback(s), the UE can send two types of sCQI. One sCQI can be based on an sCSI-reference resource which assumes a certain number, x, such as 2 or 3, of OFDM symbols for PDCCH and another sCQI feedback, such as an offset sCQI to the sCQI derived based on the sCSI-reference resource. The type, such as the first type only or the first type and the second type, may also be indicated to the UE, such as via a field in (E)PDCCH or sPDCCH or via higher layers.

If a 2-symbol TTI that the eNB schedules does not contain CRS REs, the eNB may choose a slightly higher MCS index or the UE may get an MCS that has an offset to be indicated to the UE or to be assumed by the UE similar to the slot-level design above. The UE may also send another sCQI as an offset to the one that assumes certain CRS overhead.

For the case of UE-specific overhead, similar approaches to get sCQI when UE-specific RS is absent in an sTTI are possible. For example, sCQI when no UE-specific RS is present in an sTTI can be derived based on an offset with respect to sCQI derived based on the presence of UE-specific RS present and based on a new sCSI reference resource definition. For example, basically two different sCQI types can be reported: with and without presence of UE-specific RS assumption.

A CSI reference resource can be defined in a valid DL or special subframe in LTE. For a UE configured in transmission mode 1-9 or transmission mode 10 with a single configured CSI process for the serving cell, the sCSI reference resource can be defined by a single downlink or special sTTI n-nsCQI_ref, assuming sCSI report in UL sTTI "n", where for periodic sCSI reporting nsCQI_ref can be the smallest value greater than or equal to 4, such that it corresponds to a valid downlink or valid special sTTI, and where for aperiodic sCSI reporting, if the UE is not configured with the higher layer parameter csiSubframePatternConfig-r12, nsCQI_ref can be such that the reference resource is in the same valid downlink or valid special subframe as the corresponding sCSI request in an uplink DCI format.

The CQI indices and their interpretations for LTE are described above for reporting CQI based on different modulations. For sTTI operation, the Turbo-code length can become smaller due to the limited number of resources in time, such as the limited number of OFDM symbols, and the existing tables can be reused but with some modifications. Table 6 is a number of non-CRS REs in a 2-symbol sTTI for 2 CRS antenna ports. A code block in LTE can vary from 40 bits in length to 6144 bits. Considering the REs available in a subframe assuming 2 CRS antenna ports and 2 symbol control, (14−2)*12−16=128 REs/PRB. Whereas in 2-symbol there are 20 RE/RB if CRS present and 24 RE/RB if CRS is absent.

TABLE 6

Number of non-CRS REs in a 2-symbol sTTI, (2 CRS antenna ports).

| #of RBs configured for sTTI operation | available REs in a sTTI with CRS | available REs in a sTTI without CRS |
| --- | --- | --- |
| 6 | 120 | 144 |
| 15 | 300 | 360 |
| 25 | 500 | 600 |
| 50 | 1000 | 1200 |
| 75 | 1500 | 1800 |
| 100 | 2000 | 2400 |

If a UE is configured to report sCQI corresponding to a sTTI length, such as to get the most update information about the channel characteristics, the CQI tables used for regular 1 ms-TTI operation in LTE may be reused subject to some modifications. New tables can be made as an offset to current CQI/MCS tables. The offset with respect to CQI/MCS table entries can be to compensate the turbo-code loss for the smaller TTI length. The offset can be tabulated in the specifications as a one-to-one mapping of the CQI/MCS tables. Alternatively, an offset can be signaled to the UE, such as in the aperiodic CSI trigger or in 1-level DCI valid for a subframe or via higher layer signaling. Different CQI/MCS tables can also be made. Subsampling the current CQI/MCS tables can additionally be used to make new tables.

Figure 8:
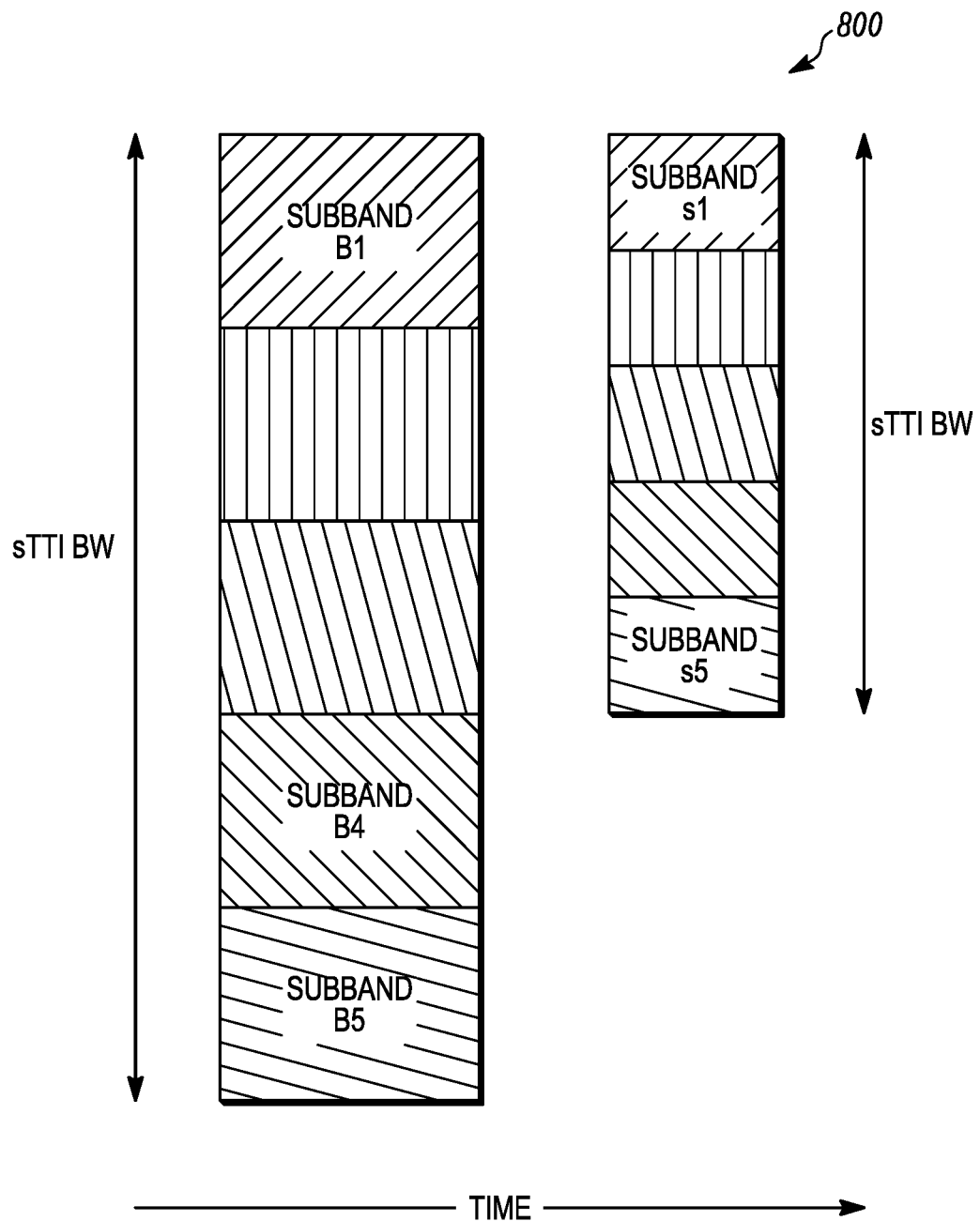
FIG. 8 is an example illustration of a subband definition update based on the BW split change between sTTI UEs and non-sTTI UEs according to a possible embodiment.

FIG. 8 is an example illustration 800 of a subband definition update based on the BW split change between sTTI UEs and non-sTTI UEs according to a possible embodiment. Subband size in frequency units can be updated based on the system bandwidth split between sTTI UEs and non-sTTI UEs or based on the BW given to that sTTI in case multiple sTTI lengths are allowed simultaneously in the system. For sTTI operation with a particular sTTI length, a subband can be a set of k contiguous PRBs. The value of k can be derived in different ways. For example, a new k, which can be different than the k defined for regular TTI, can be defined for each sTTI length and for a total DL system BW or maximum allowable sTTI BW, which can be defined or configured. The value of k can be fixed in the specifications for each sTTI length and for a total DL system BW or maximum allowable sTTI BW. Alternatively, k can be determined via higher layer signaling such as Radio Resource Control (RRC) or MAC. For instance, similar to the existing RRC signaling, a new field in CQI configuration, such as CQI-ReportConfig, can be defined. As another example, k for sTTI operation can be a function of BW split between sTTI and non-sTTI UEs. The split can be dynamic, semi-static, or static. The k for 1 ms TTI operation with a shortened processing time, such as where minimum timing is reduced compared to that of legacy LTE operation, or 1 ms-UEs aware of some sTTI related information can also be determined via one of the above methods. The first example may provide simplicity of design and specification, but a UE may end up sending a report for a frequency region where it may not be scheduled at all. Some embodiments below can focus on the second example. The second example may be done when the BW split is done by higher than physical layer signaling.

Figure 9:
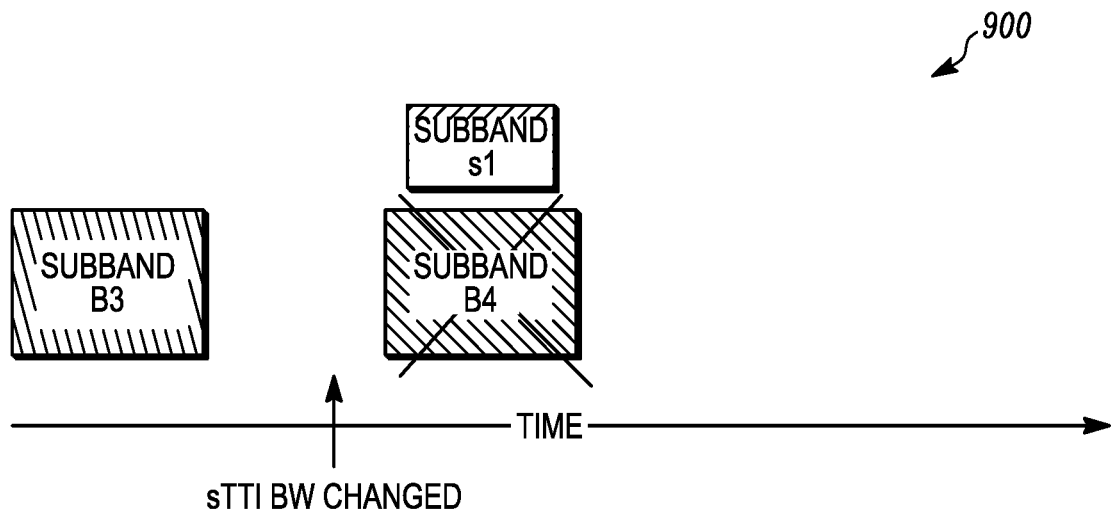
FIG. 9 is an example illustration of subband definition update and reporting in periodic CQI based on the updated sBW according to a possible embodiment.

FIG. 9 is an example illustration 900 of subband definition update and reporting in periodic CQI based on the updated sBW according to a possible embodiment. The subbands can be defined as shown in the illustration 800. Subbands B4 and B5 may not be part of the updated sTTI BW. In periodic reporting as the sTTI BW changes, only subbands belonging to the current BW split may be reported. If it is a subband turn to be reported, and now the subband does not belong to the set of frequencies in the updated sTTI BW, according to a possible alternative, the UE can cycle through subbands to find a subband belonging to the sBW, such as the sTTI BW, and reports that in that occasion. It is also possible that for a certain range of the sBWs, subband definition, such as a "k" value, can be kept the same.

Figure 10:
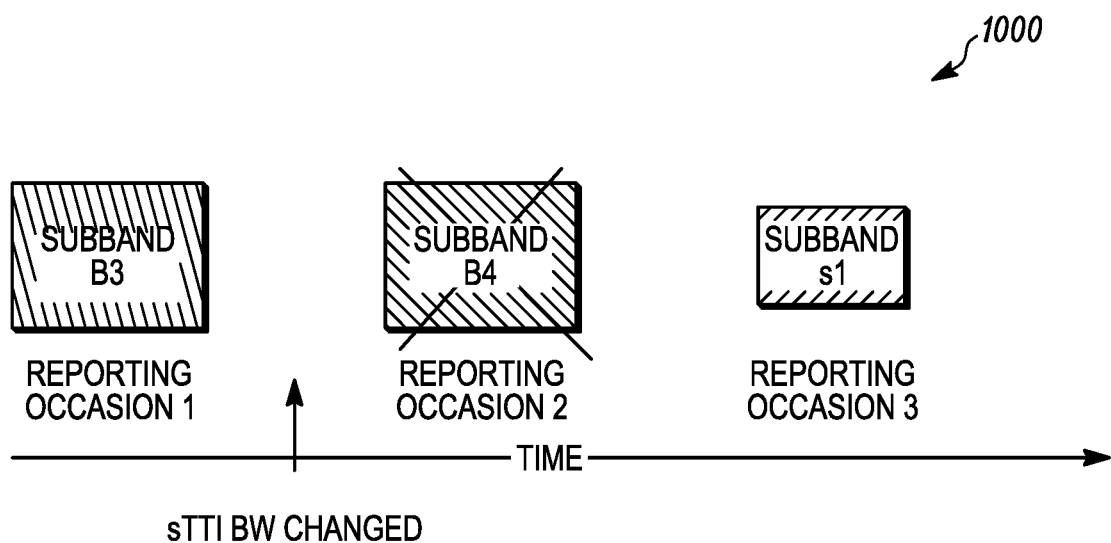
FIG. 10 is an example illustration of dropping a report in a reporting occasion due to a recent sTTI BW change according to a possible embodiment.

FIG. 10 is an example illustration 1000 of dropping a report in a reporting occasion due to a recent sTTI BW change according to a possible embodiment. According to this possible alternative when it is a subband turn to be reported, and now the subband does not belong to the set of frequencies in the updated sTTI BW, a certain number of periodic report occasions, which can be one (1) occasion depending on the time distance from the sTTI BW update, can be dropped to give the UE time to compute the subband CQIs based on the updated subband definition.

For an aperiodic CQI report, the UE can discard the aperiodic DCI trigger if it cannot update subband reports in a timely fashion. Alternatively, the eNB, after changing the sBW, may not trigger an aperiodic report sooner than x ms/TTI for both a sTTI UE and a regular TTI UE with enhanced capability of sTTI knowledge. If the FDM BW split changes faster than higher layer signaling for configuring CQI report for aperiodic CQI, the UE can derive the updated subband indices based on the higher layer configuration of the CQI report and the sBW split for aperiodic and periodic reports. As an example, for periodic/aperiodic report, k=4 and sTTI BW in number of RBs called $N_{RB}^{DL,s}$=20, then the number of possible subbands can be 5. If the updated $N_{RB}^{DL,s}$=10, then the number of subbands can become: 10/4=2.5, then there can be 3 subbands. If the updated $N_{RB}^{DL,s}$=40, number of subbands becomes: 40/4=10, then there can be 10 subbands. In this example, subband size for sTTI can change with higher layer, and can be fixed to 4 RBs. According to another possible implementation, if the FDM BW split changes faster than higher layer signaling for configuring CQI report for aperiodic CQI, a new "k" can be signaled via the physical layer or via a higher layer.

The subband CQI can generally be computed as a differential to a wideband CQI. The wideband CQI can be calculated based on the BW split. For example, the wideband CQI can be calculated for the entire sBW for the sTTI. If the BW split changes via a higher layer, then a new "k" can be signaled via higher layer.

Table 7 is a table of subband size (k) and number of subbands (M) in S vs. downlink system bandwidth in current LTE systems, which can be similar to table 7.2.1-5 as given in TS 36.213. For an "M" selected subband case, there can be a new set of subband size (k) and number of subbands (M) in subband set S vs. downlink system bandwidth given to sTTI operation, which can be defined. The sTTI length can be taken into account in determining this table. A regular TTI UE with enhanced capability of sTTI knowledge may only report subbands belonging to the BW given to non-sTTI UEs. The BW given to sTTI UEs can be signaled to those UEs as well.

TABLE 7

Subband Size (k) and Number of Subbands (M) in S vs. Downlink System Bandwidth in current LTE systems

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

Table 8 is a table of subband size (k) and number of subbands (M) in S vs. downlink system bandwidth allocated to 1 ms-TTI UEs with BW split knowledge. This table can be for UEs operating with 1 ms TTI but aware of BW split between 1 ms UEs and sTTI UEs.

TABLE 8

Subband Size (k) and Number of Subbands (M) in S vs. Downlink System Bandwidth allocated to 1 ms-TTI UEs with BW split knowledge

| System Bandwidth allocated to 1 ms-TTI UEs $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

Table 9 is a table of subband size (k) and number of subbands (M) in S vs. downlink system bandwidth allocated to slot-level TTI UEs.

TABLE 9

Subband Size (k) and Number of Subbands (M) in S vs. Downlink System Bandwidth allocated to slot-level TTI UEs

| System Bandwidth allocated to 0.5 ms-TTI UEs $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

Table 10 is a table of subband size (k) and number of subbands (M) in S vs. downlink system bandwidth allocated to 2-symbol-TTI UEs.

TABLE 10

Subband Size (k) and Number of Subbands (M) in S vs. Downlink
System Bandwidth allocated to 2-symbol-TTI UEs

| System Bandwidth allocated to 2-symbol--TTI UEs $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

It is also possible to have "M" change based on the subband size and the allocated sBW while the subband size is fixed, which may be only a function of total system BW or maximum allowable sTTI BW and sTTI length, as sBW changes.

An sPDCCH can trigger an aperiodic CSI report, such as over the system BW allocated to sTTI operation. In some cases, an eNB may want to get an aperiodic CSI report from a UE for both 1 ms TTI and sTTI, or possibly for two or more different TTI lengths. The reports can be sent in different times. For example, an sTTI CSI report can be sent in an sTTI in UL, while a 1 ms-TTI CSI report can be sent later in a 1-ms subframe in UL. One solution can be for the eNB to send an (E)PDCCH command to trigger an aperiodic report for 1-ms operation and an sPDCCH command to trigger an aperiodic report for sTTI operation, such as in the same subframe.

Figure 11:
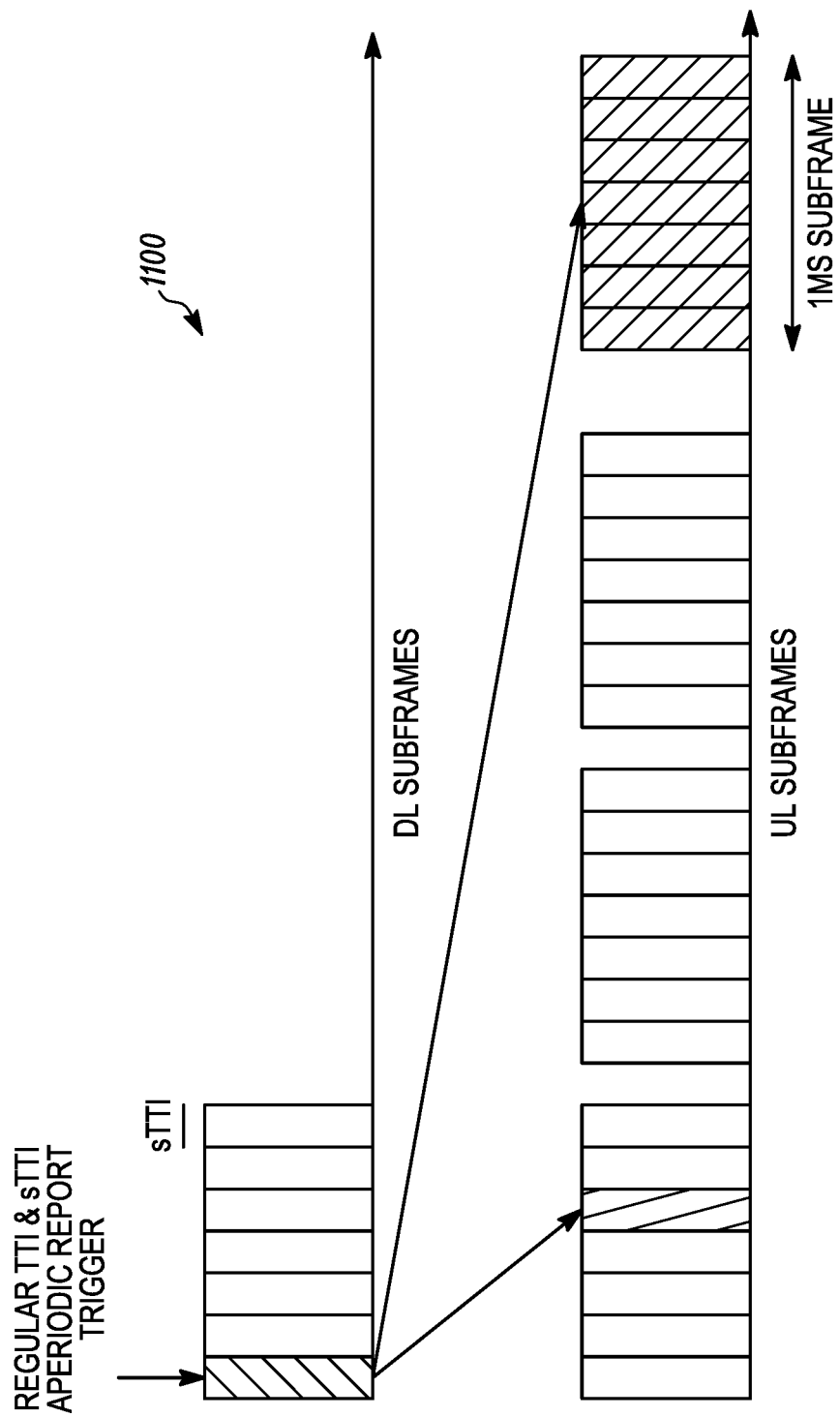
FIG. 11 is an example illustration of a PDCCH command triggering aperiodic CSI report for both sTTI and regular (1 ms)-TTI according to a possible embodiment.

FIG. 11 is an example illustration 1100 of a PDCCH command triggering aperiodic CSI report for both sTTI and regular TTI, such as 1 ms-TTI, according to a possible embodiment. Another solution for sending CSI reports in different times can enable a eNB to use one control command, such as (E)PDCCH or a special sPDCCH possibly at the beginning of a subframe or in any sTTI in a subframe, to trigger both aperiodic reports possibly in different time instances. For instance, the sTTI CSI report can be sent in an sTTI in UL, while 1 ms-TTI CSI report can be sent later in a 1-ms subframe in UL. Similar bit-fields used in current specifications for triggering an aperiodic report for different CSI-processes, serving cells, etc. as tabulated in tables 7.2.1.A to 7.2.1.E of TS 36.213 can be used to trigger one of the following example cases: 1 ms-TTI CSI report+sTTI CSI report; 1 ms-TTI CSI report; and sTTI CSI report. The triggered CSI reports may belong to different transmission modes, UE-specific RS configurations, CQI bands, etc. corresponding to the different TTI lengths.

A UE can be configured to operate in 1-ms TTI and sTTI, such as 2 symbol-TTI (2sym-TTI) and/or 0.5 ms-TTI. Transmission Mode (TM) configuration can be done via higher layers. The UE may be configured to operate in more than one TTI length, such as 1-ms TTI and 2sym-TTI. There are various ways to configure TMs for multiple TTI length.

One way to configure TMs for multiple TTI length can use independent TM configurations. For each TTI length configured for the UE, there can be a separate TM configuration, which can be set along with configuration of the TTI length. For example, a UE can be configured to operate with 1 ms-TTI, for which it is RRC configured to do TM-10 with the first codebook subset restriction for PMI/RI. Later, the UE can additionally be configured to operate with 2sym-TTI to do TM-9 with another codebook subset restriction for PMI/RI. If the UE is scheduled via (E)PDCCH/sPDCCH to send aperiodic CSI for a TTI, it can use the corresponding parameters, such as codebook subset restriction, of that TTI.

Another way to way to configure TMs for multiple TTI length can use joint TM configuration: for all (some) configured TTI lengths, the same TM configuration can be used. If the same TM is configured for a UE for operation in 1 ms-TTI and sTTI, some of the configuration parameters can be different. For instance, the eNB can configure different codebook subset restriction for different TTI length and/or use the same configured codebook subset restriction as of 1 ms-TTI but with additional RI restriction. For MAC-CE/Physical control signaling to update some TM parameters, as the eNB may have the knowledge of whether one or multiple TTI lengths are going to be used in near future, it can update some parameters of the TM configuration, such as from the default parameters indicated in RRC to tailor it to the use-case. For instance, the eNB can communicate with a UE only with 2sym-TTI at least for the duration of the next "X" ms. "X" can be fixed or configured or (semi)dynamically signaled, such as by MAC-CE or physical layer control command.

Figure 12:
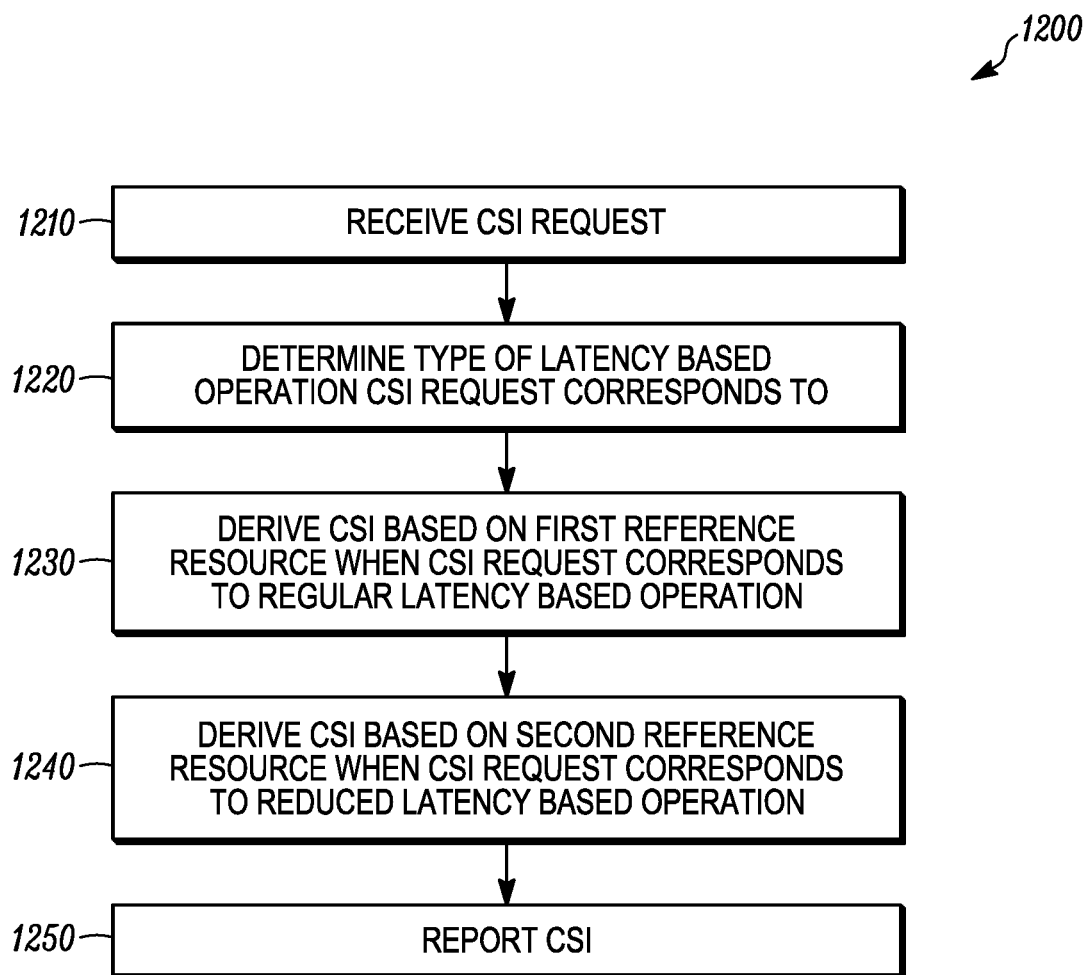
FIG. 12 is an example flowchart illustrating the operation of a wireless communication device according to a possible embodiment.

FIG. 12 is an example flowchart 1200 illustrating the operation of a wireless communication device, such as the device 110, according to a possible embodiment. At 1210, a CSI request can be received. The CSI request can be received in a control channel. The CSI request can request the device to feedback CSI, which can include CQI, PMI, and/or RI.

At 1220, a determination can be made as to whether the CSI request corresponds to regular latency based operation or reduced latency based operation. The regular latency based operation can be based on a first communication processing time. The reduced latency based operation can be based on a second communication processing time shorter than the first communication processing time. A shorter communication processing time can be minimum timing reduced compared to that of legacy LTE, such as 4G, operation, such as for the first TTI lengths. A communication processing time can be a processing time between reception of the UL grant and the corresponding UL transmission. Another example can include time between reception of DL data and transmission of a corresponding HARQ ACK.

The regular latency based operation can be based on a first TTI length that can be based on a first number of OFDM symbols. The reduced latency based operation can be based on at least a second TTI length that can be based on a second number of OFDM symbols. The second number of OFDM symbols can be shorter than the first number of OFDM symbols. For example, the first TTI length can be or can be related to a first number of OFDM symbols and the second TTI length can be or can be related to a second number of OFDM symbols. As a further example, the first TTI length can have a duration of a 1 ms subframe and the second TTI length can be less than the duration of the 1 ms subframe. The term "subframe" can refer to a time domain container spanning a fixed number of OFDM symbols. The term "subframe" can also be used for describing something more, such as a particular set of signals/channels present within a container. For example, 'subframe duration' can be 1 ms for a numerology with 15 kHz subcarrier spacing, and ½ m ms for numerology with 2 m*15 kHz subcarrier spacing. A subframe can include a fixed number of 14 OFDM symbols.

According to a possible implementation, the CSI request can be received in a subframe. The second TTI length can be a duration within the subframe shorter than the length of the subframe. The CSI request can correspond to a regular latency based operation when the CSI request is received in a control channel in at least a first symbol of the subframe. The CSI request can correspond to reduced latency based operation when the CSI request is received in a control channel received in a TTI with the second TTI length within the subframe.

The CSI request can be determined to correspond to regular latency based operation or reduced latency based operation based on an indicator included in the control channel. For example, the control channel can include an indicator that indicates a CSI request and can include an indicator that indicates the type of latency based operation. The indicator that indicates the type of latency can also be included in the CSI request in the control channel. The indicator can be specific bits, can be a CRC mask, or can be any other indicator.

At 1230, CSI can be derived based on a first reference resource when the CSI request corresponds to regular latency based operation. A reference resource can be a set of time frequency resources assumed by the UE and used for computation of a CQI index corresponding to a MCS value such that a transport block can be transmitted over the reference resource with the MCS value within a certain BLER, such as not exceeding 0.1.

At 1240, CSI can be derived based on a second reference resource when the CSI request corresponds to reduced latency based operation. The reduced latency based operation can have a latency less than the regular latency based operation.

Deriving CSI based on the second reference resource can include deriving CSI based on a first subband size when the CSI request corresponds to reduced latency based operation. The first subband size can be determined based on a number of resource blocks used for reduced latency based operation. A subband can be a set of a number of contiguous physical resource blocks. According to this implementation, deriving CSI based on a first reference resource in block 1230 can include deriving CSI based on a second subband size when the CSI request corresponds to regular latency based operation. The second subband size can be determined based on a number of resource blocks used for regular latency based operation. The second subband size can also be determined based on system bandwidth, such as in legacy LTE, or other factors. The first subband size can be greater than the second subband size to possibly reduce the feedback overhead for sTTI operation or to align subband size with resource allocation size in terms of number of RBs. For example, subband size can be a fraction of the resource allocation size.

According to a possible embodiment, deriving CSI based on the first reference resource can also include deriving CSI based on a restriction to a first subset of precoders belonging to a set of precoders. Deriving CSI based on the second reference resource can include deriving CSI based on a restriction to a second subset of precoders belonging to the set of precoders. The second subset of precoders can be different from the first subset of precoders. The first subset of precoders can overlap the second subset of precoders while including at least one different precoder or the first subset of precoders can be mutually exclusive from the second subset of precoders.

According to another possible embodiment, deriving CSI based on the second reference resource can include deriving CSI based on a restriction to a RI value associated with the CSI. Rank can be a number of simultaneous spatial streams possible for communication between a base station and device. For example, if the base station has eight antennas and the device has four antennas, up to four spatial streams can be possible. When channel conditions are not good, fewer than four spatial streams can be possible. "Codebook subset restriction" in the LTE specifications can refer to an indication restricting the number of precoders corresponding to a particular rank from a set of precoders for that rank. As discussed in the present disclosure for joint TM configuration, for all or some configured TTI lengths, the same TM configuration can be used. If the same TM is configured for a UE for operation in 1 ms-TTI and sTTI, some of the configuration parameters can be different. For instance, the base station can use the same configured codebook subset restriction as of 1 ms-TTI, but with an additional RI restriction. The base station and UE can have the same assumption with respect to codebook subset restriction. As also discussed in the present disclosure, the sCSI may not include sRI, and for rank information, the base station may rely on the most recent RI reported, such as for 1 ms operation, for the purpose of sTTI scheduling, which can be subject to a possible rank restriction. For example, ranks higher than 4 may not be possible in an sTTI for sTTI operation, whereas ranks up to 8 can be possible for a subframe for 1 ms operation. As a further example, according to Technical Specification (TS) 36.213, "A UE is restricted to report PMI, RI and PTI within a precoder codebook subset specified by one or more bitmap parameter(s) codebookSubsetRestriction, codebookSubsetRestriction-1, codebookSubsetRestriction-2, codebookSubsetRestriction-3 configured by higher layer signaling . . . . For a specific precoder codebook and associated transmission mode, the bitmap can specify all possible precoder codebook subsets from which the UE can assume the eNB may be using when the UE is configured in the relevant transmission mode."

According to another possible embodiment, deriving the CSI based on the second reference resource can include deriving CSI based on a RI assumption corresponding to the regular latency operation. For example, the restriction to the RI value associated with the CSI can be determined according to a RI assumption corresponding to the regular latency operation. As discussed above, the rank of the channel may not change between regular TTI and sTTI operation. Thus, in some examples, the UE may assume for sTTI CSI computation the rank is same as the rank of the most recent RI reported for regular TTI. This can help with reducing the sTTI CSI computation complexity. The regular TTI and sTTI CSI configurations can be in the same CSI process. In other embodiments, the UE can be explicitly configured with a 'RI-reference' regular TTI CSI process to use for sTTI operation, such as a sTTI CSI process. This can be for the case when regular TTI and sTTI CSI are independently configured in different CSI processes. The set of restricted RIs with precoder codebook subset restriction can be the same for sTTI and regular TTI CSI. The CSI reporting mode can support RI reporting for regular TTI CSI.

At 1250, the derived CSI can be reported to a network. For example, the CSI can be transmitted to a base station, sent to an access point, or otherwise reported to a network.

Figure 13:
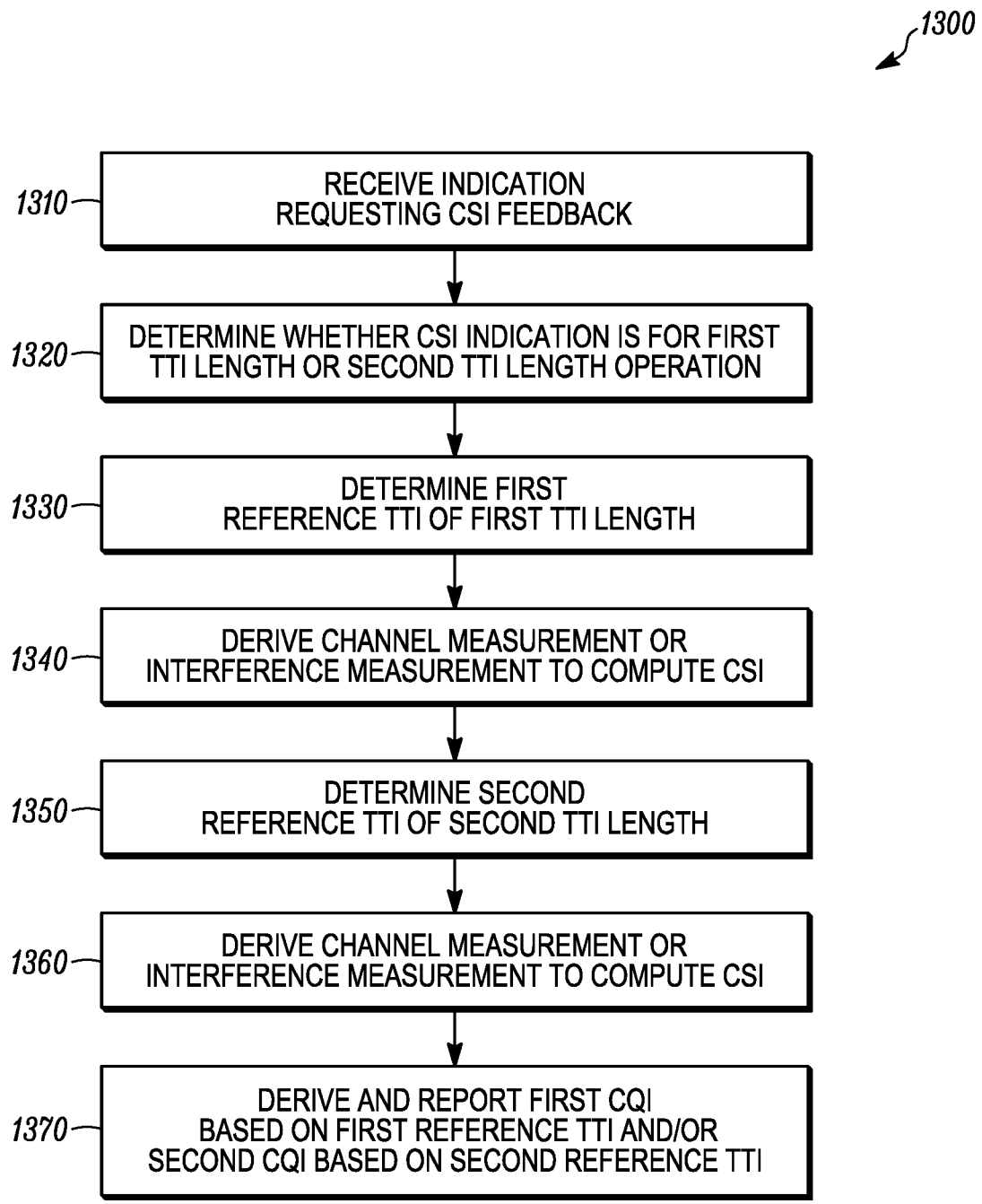
FIG. 13 is an example flowchart illustrating the operation of a wireless communication device according to a possible embodiment.

FIG. 13 is an example flowchart 1300 illustrating the operation of a wireless communication device, such as the device 110, according to a possible embodiment. At 1310, an indication can be received at the device from a network. The indication can request the device to feedback CSI corresponding to a first TTI length operation and/or a second TTI length operation. The indication can request the device to feedback CSI corresponding to a first TTI length operation in a control channel associated with the first TTI length operation and/or a second TTI length operation in a control channel associated with the second TTI length operation.

The indication can be received in an explicit CSI request on a control channel. The indication can also be implicit. For example, an implicit indication can occur whenever the device, such as a UE, receives a sPDSCH corresponding to sTTI operation or receives a resource assignment assigning resources with sTTI granularity. The UE can feedback CSI for the sTTI operation. Such implicit CSI feedback behavior can be, for example, configured by higher layers, can be associated using a separate identifier, such as RNTI, can be DCI format for the DL control channels carrying sTTI based resource assignments, and/or can be otherwise implicit CSI feedback behavior. Another implicit CSI request can be a periodic CSI report in which CSI can be reported periodically with a certain interval specified by higher layer message, such as RRC Connection Reconfiguration, RRC Connection Setup, or other higher layer message. The indication can also be received in a RACH Response (RAR) message instead of a control channel.

The indication can be provided by a layer higher than physical layer signaling. For example, a CSI request can be implicit by being a periodic CSI report in which CSI can be reported periodically. The indication can request CSI feedback to be reported in a plurality of time instances. The time instances in the plurality of time instances can be equidistant in time.

At 1320, a determination can be made as to whether the CSI indication requests CSI feedback for the first TTI length operation and/or the second TTI length operation. The first TTI length operation can have a shorter time duration than the second TTI length operation and/or can have a same time duration as the second TTI length operation, but can be associated with a shorter communication processing time than a communication processing time associated with the second TTI operation.

The CSI feedback indication can be determined to be for the first TTI length operation based on a first RNTI. The CSI feedback indication can be determined to be for the second TTI length operation based on a second RNTI.

The determination can be based on a control field corresponding to the indication. The control field can be received in control signaling from a network. For example, the control field can be received in DCI on a control channel, such as on the PDCCH or the sPDCCH or can be received in a RAR grant. The DCI can also be received in a RAR grant. The RAR grant can be received in a PDSCH. The PDSCH assignment can be provided in a DCI on a control channel, such as PDCCH, with CRC scrambled with RA-RNTI.

The CSI feedback indication can be for the second TTI length operation and can be received in a TTI within a subframe, and the TTI within the subframe is of the first TTI length. The reference signals associated with the second reference TTI can include reference signals transmitted until the end of the second reference TTI. A first OFDM symbol of the second TTI may not coincide with a first OFDM symbol of the subframe.

At 1330, a first reference TTI of a first TTI length can be determined based on the TTI in which the indication is received when the indication requests CSI feedback for the first TTI length operation. In different steps of the flowchart 1300, a reference TTI may be before, on, or after the TTI in which the indication is received.

At 1340, a channel measurement to compute the CSI can be derived using reference signals associated with the first reference TTI. Alternately or in addition to deriving the channel measurement, an interference measurement to compute the CSI can be derived using measurements made on resource elements associated with the first reference TTI.

At 1350, a second reference TTI of a second TTI length can be determined based on the TTI in which the indication is received when the indication requests CSI feedback for the second TTI length operation. The first reference TTI can include a first set of frequency resources and the second reference TTI can include a second set of frequency resources. The first set and the second set of frequency resources can be different. The first and second set of frequency resources may not necessarily be different in all instances. The sets of frequency resources can be sets of time-frequency resources. The first set of frequency resources and/or the second set of frequency resources can be determined based on system bandwidth split between the first TTI length operation and the second TTI length operation.

At 1360, the channel measurement to compute the CSI can be derived using reference signals associated with the second reference TTI. Alternately or in addition to determining the channel measurement, an interference measurement to compute the CSI can be determined using measurements made on resource elements associated with the second reference TTI. At 1370, a first CQI index can be derived and reported based on the first reference TTI and/or a second CQI index can be derived and reported based on the second reference TTI. The first CQI index can be reported as an offset to the most recently reported second CQI index.

For example, a wideband CQI for sTTI operation can be encoded differentially, such as by using 1 or 2-bits, with respect to most recent wideband CQI reported for regular TTI operation to help with reducing the feedback overhead. This can be used when CSI for both regular TTI and sTTI are reported at the same time. For example, wideband differential CQI sTTI offset level=sTTI wideband CQI index−regular TTI wideband CQI index, as discussed in embodiments above.

Deriving and reporting can include deriving and reporting the first CQI index based on the first reference TTI, the second CQI index based on the second reference TTI, and/or a third CQI index along with the first CQI index. The first CQI index can be derived based on a first overhead assumption associated with the first TTI reference. The third CQI index can be derived based on a second overhead assumption associated with the first TTI reference. Overhead can include resource elements reserved for control signals and pilot signals. Also, an overhead assumption can include at least one selected from a number of PDCCH symbols, and a number of Cell specific Reference Signal Resource Elements (CRS-REs). Overhead assumption can assume a certain number of resource elements are used for overhead. When deriving a CQI index based on an overhead assumption associated with a TTI reference, the overhead associated with the TTI reference can be used for CQI derivation regardless of whether the used overhead is correct.

Figure 14:
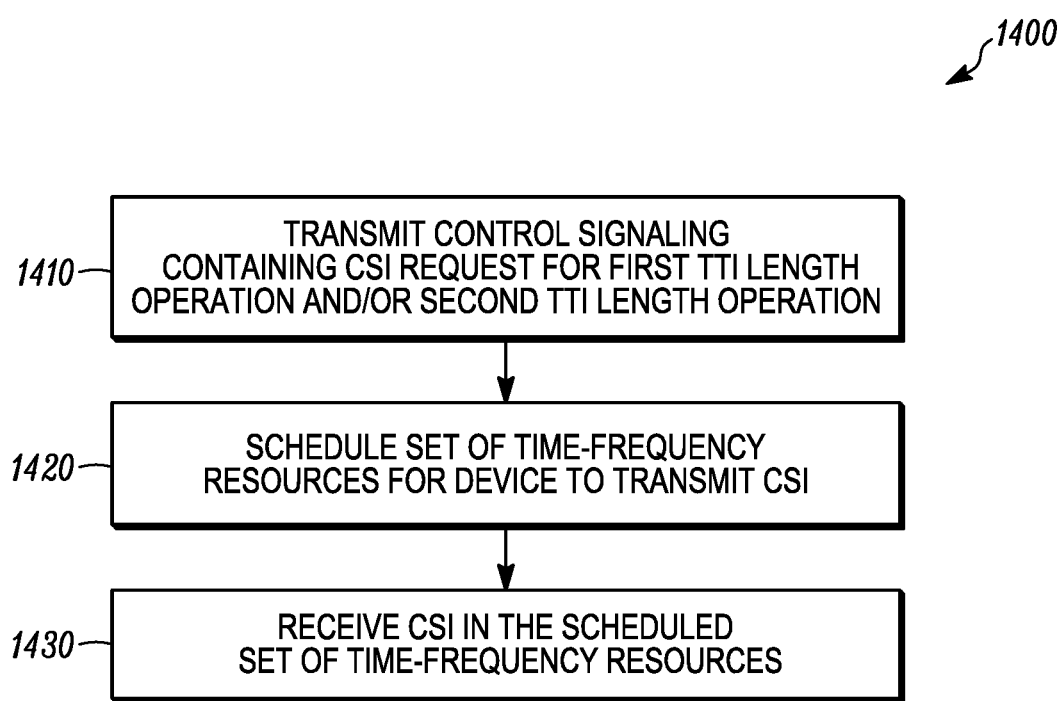
FIG. 14 is an example flowchart illustrating the operation of a wireless communication device according to a possible embodiment.

FIG. 14 is an example flowchart 1400 illustrating the operation of a wireless communication device, such as the base station 120, according to a possible embodiment. At 1410, control signaling containing a CSI request can be transmitted to a device, such as the device 110. Transmitting can be performed by use of a controller, such as a processor, and a transceiver. The CSI request can request the device to feedback channel state information corresponding to a first TTI length operation and/or a second TTI length operation. The first TTI length operation can have a different TTI length than the second TTI length operation. The CSI request can request the device to feedback CSI corresponding to a first TTI length operation in a control channel associated with the first TTI length operation. The CSI request can also request the device to feedback CSI corresponding to a second TTI length operation in a control channel associated with the second TTI length operation.

The CSI request can be provided by a layer higher than physical layer signaling. The CSI request can request CSI feedback to be reported in a plurality of time instances. For example, a CSI request can be implicit by being a periodic CSI report in which CSI can be reported periodically. The time instances in the plurality of time instances can be equidistant in time.

At 1420, a set of time-frequency resources can be scheduled for the device to transmit the requested CSI. The set of time-frequency resources to transmit the requested CSI can be scheduled by allocating the set of time-frequency resources to the device. The set of time-frequency resources include a first set of time-frequency resources and a second set of time-frequency resources. The first set of time-frequency resources can belong to a first TTI of the first length. The second set of time-frequency resources can belong to a second TTI of the second length. The first and second set may not necessarily be different in all instances. The first TTI can occur before the second TTI in time. For example, the first TTI can occur in an earlier UL subframe than the second TTI. The first set of time-frequency resources and/or the second set of time-frequency resources can be determined at least based on system bandwidth split between the first TTI length operation and the second TTI length operation. At 1430, the CSI can be received in the scheduled set of time-frequency resources.

Figure 15:
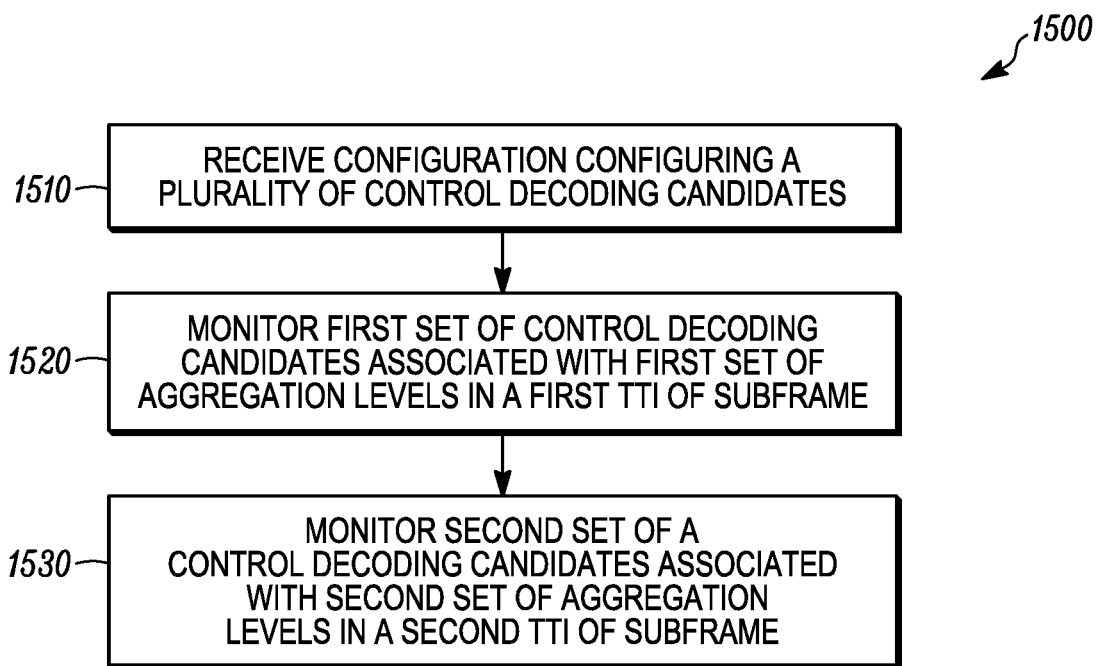
FIG. 15 is an example flowchart illustrating the operation of a wireless communication device according to a possible embodiment.

FIG. 15 is an example flowchart 1500 illustrating the operation of a wireless communication device, such as the device 110, according to a possible embodiment. At 1510, a configuration can be received. The configuration can configure a plurality of control decoding candidates.

At 1520, a first set of the plurality of control decoding candidates associated with a first set of aggregation levels can be monitored in a first TTI of a subframe. Monitoring can imply attempting to decode. At 1530, a second set of the plurality of control decoding candidates associated with a second set of aggregation levels can be monitored in a second TTI of the subframe. The first set of aggregation levels can be different than the second set of aggregation levels. The first and second sets of the plurality of control decoding candidates can be different at least in one control decoding candidate. A number of decoding candidates in the first set of the plurality of control decoding candidates can be different from a number of decoding candidates in the second set of the plurality of control decoding candidates.

The first TTI and the second TTI can be sTTI, such as a TTI shorter than, and/or associated with a shorter processing time than another TTI in a subframe. The terms first TTI and second TTI can be used to differentiate the TTIs from each other and do not necessarily represent the location of the TTIs in the subframe. For example, the first TTI is not necessarily the first absolute TTI of the subframe and the second TTI is not necessarily the TTI immediately following the first TTI. The first TTI can be in a first slot of the subframe and the second TTI can be in a second slot of the subframe.

The first set and second set of the plurality of control decoding candidates can be based on a UE identifier, a subframe index, an index associated with the first TTI within the subframe, an index associated with the second TTI within the subframe, and/or any other useful information. The index associated with the first and/or the second TTI within the subframe can be a sTTI index within the subframe. A sTTI index can be associated with a TTI with a length shorter than a length of a subframe. The index associated with the first TTI and/or the second TTI within the subframe can be a slot index corresponding to the first TTI and/or the second TTI of the subframe.

The second set of the plurality of control decoding candidates can be based on the first set of the plurality of control decoding candidates. A position of control decoding candidates of the second set of the plurality of control decoding candidates can be derived based on knowledge of positions of control decoding candidates in the first set of the plurality of control decoding candidates. The positions can be in CCEs in the frequency domain.

The first set of the plurality of control decoding candidates can be mapped to a first set of PRB-sets. The second set of the plurality of control decoding candidates can be mapped to a second set of PRB-sets. The first set of PRB-sets can have at least one different PRB-set from the second set of PRB-sets.

A TTI can be a duration in which the device can transmit and receive a Transport Block (TB) to and from higher layers than a physical layer. For example, the term "TTI" can refer to the duration in which the device can receive/transmit a TB from higher layers, such as a MAC PDU from a MAC layer that is higher than a physical layer. Therefore, the TTI length can depend on how TBs are mapped to REs and OFDM symbols. The TTI can include resources for a control channel, which can be used for resource assignment within the TTI to the device.

Figure 16:
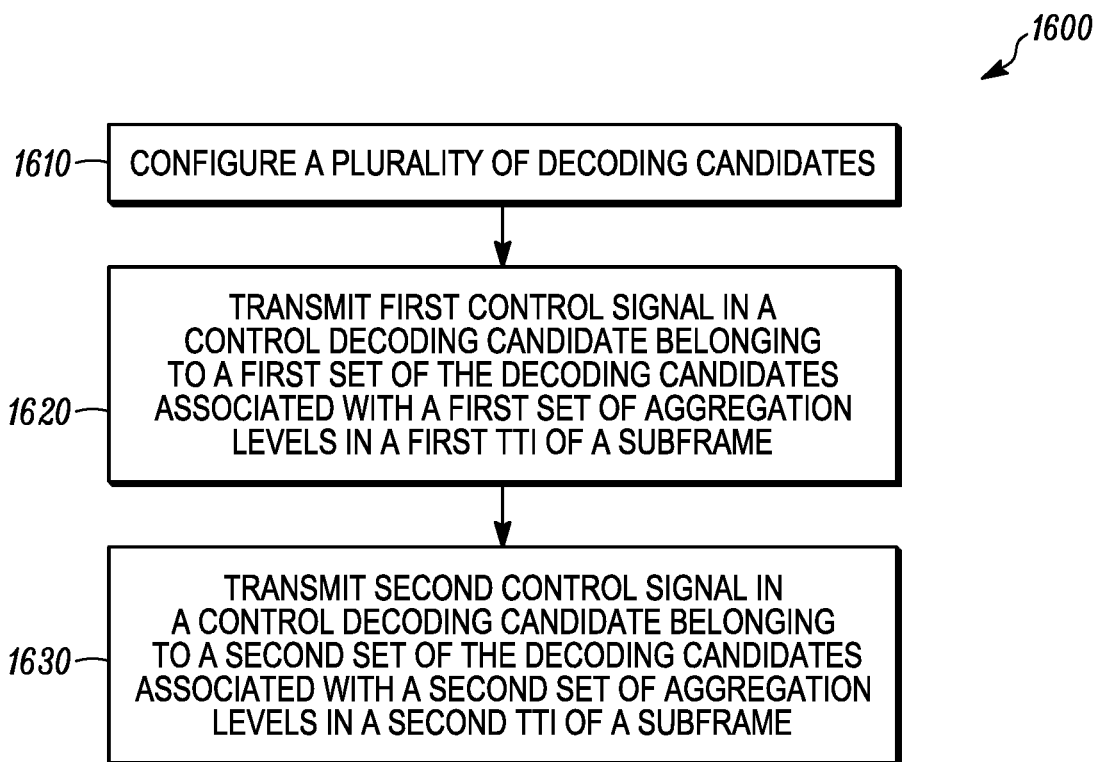
FIG. 16 is an example flowchart illustrating the operation of a wireless communication device according to a possible embodiment.

FIG. 16 is an example flowchart 1600 illustrating the operation of a wireless communication device, such as the base station 120, according to a possible embodiment. At 1610, a plurality of control decoding candidates can be configured. The plurality of control decoding candidates can be configured using a controller, such as a processor.

At 1620, a first control signal can be transmitted in a control decoding candidate belonging to a first set of the plurality of control decoding candidates associated with a first set of aggregation levels in a first TTI of a subframe. At 1630, a second control signal can be transmitted in a control decoding candidate belonging to a second set of the plurality of control decoding candidates associated with a second set of aggregation levels in a second TTI of a subframe. The first and second sets of the plurality of control decoding candidates can be different at least in one control decoding candidate. Also, the first set of aggregation levels can be different than the second set of aggregation levels.

According to a possible implementation, the first set and second set of the plurality of control decoding candidates can be based on a UE identifier, a subframe index, an index associated with the first TTI within the subframe, an index associated with the second TTI within the subframe, and/or other information. The index associated with the first TTI and/or the second TTI within the subframe can be a sTTI index within the subframe. A sTTI index can be associated with a TTI with a length shorter than a length of a subframe. The index associated with at least one selected from the first TTI and the second TTI within the subframe can be a slot index corresponding to the first TTI and/or the second TTI of the subframe.

According to a possible implementation, the first TTI can be in a first slot of the subframe and the second TTI can be in a second slot of the subframe. The number of decoding candidates in the first set and the second set of the plurality of control decoding candidates can be different. The second set of the plurality of control decoding candidates can be based on the first set of the plurality of control decoding candidates.

According to a possible implementation, the first set of the plurality of control decoding candidates can be mapped to a first set of PRB-sets. The second set of the plurality of control decoding candidates can be mapped to a second set of PRB-sets. The first set of PRB-sets and the second set of PRB-sets can have at least one different PRB-set.

Figure 17:
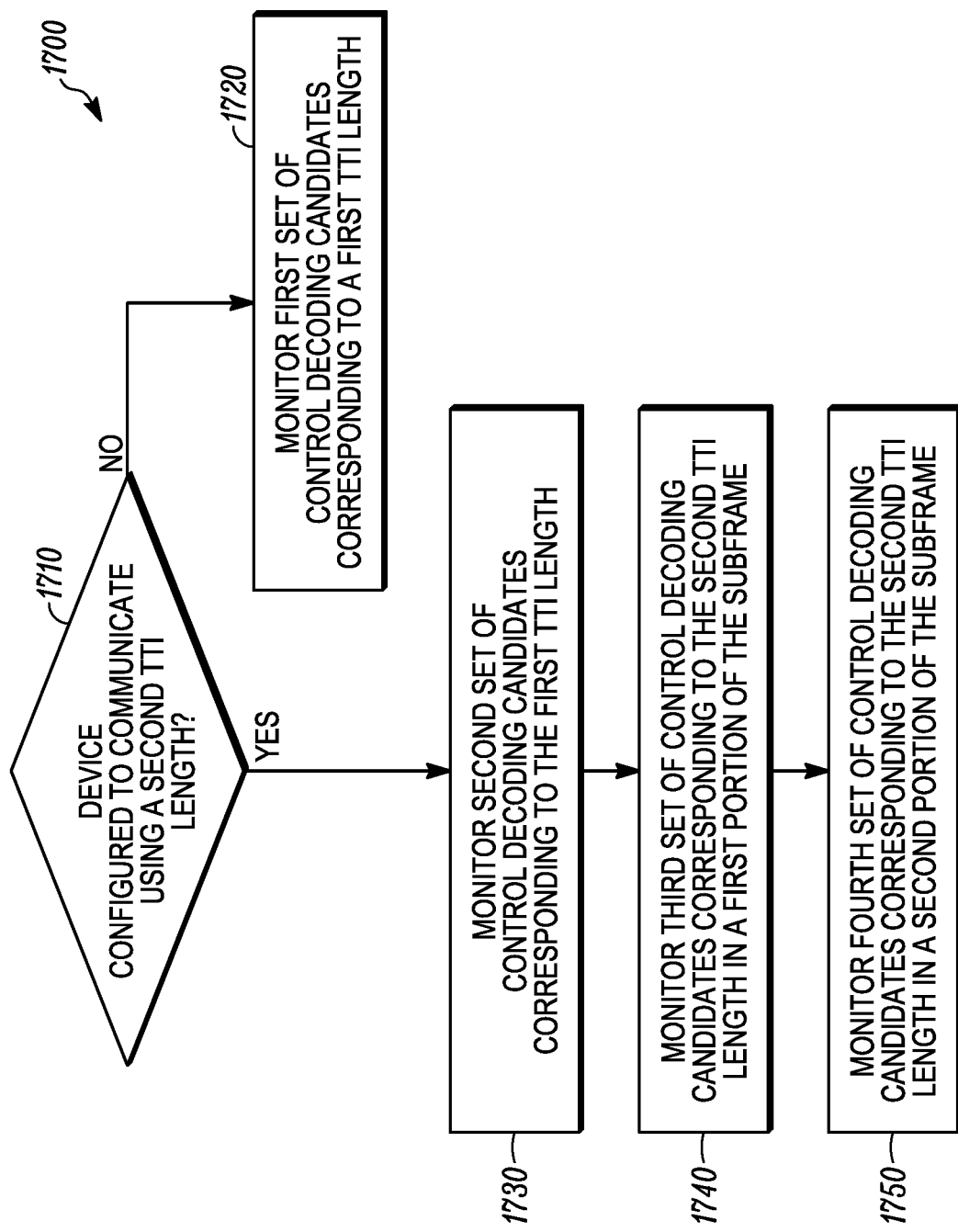
FIG. 17 is an example flowchart illustrating the operation of a wireless communication device according to a possible embodiment.

FIG. 17 is an example flowchart 1700 illustrating the operation of a wireless communication device, such as the device 110, according to a possible embodiment. At 1710, a determination can be made as to whether the device is configured to communicate using a second TTI length in a subframe. The second TTI length can be shorter than a first TTI length. At 1720, a first set of control decoding candidates corresponding to the first TTI length in a subframe can be monitored when the device is not configured to communicate using the second TTI length in the subframe. Monitoring can imply attempting to decode.

At 1730, a second set of control decoding candidates corresponding to the first TTI length in the subframe can be monitored if the device is configured to communicate using the second TTI length in the subframe. The first and the second sets can be different. A number of candidates in the second set can be less than a number of candidates in the first set. The second set can be a proper subset of the first set. The first TTI length can be a length of a subframe.

At 1740, a third set of control decoding candidates corresponding to the second TTI length in at least a first portion of the subframe can be monitored when the device is configured to communicate using the second TTI length in the subframe. The first portion of the subframe can be less than the entire length of the subframe. For example, the first portion of the subframe can be a first number of OFDM symbols in the subframe less than the total number of OFDM symbols of the subframe.

At 1750, a fourth set of control decoding candidates corresponding to the second TTI length in at least a second portion of the subframe can be monitored when the device is configured to communicate using the second TTI length in the subframe. The second portion can be different than the first portion. For example, the second portion can be temporally separate from the first portion. The number of candidates in the fourth set of control decoding candidates can be larger than the number of candidates in the third set of control decoding candidates. The first portion of the subframe can correspond to a first TTI with a length associated with the second TTI length. The second portion of the subframe can correspond to a second TTI different from the first TTI. The second TTI can have a length associated with the second TTI length. For example, the second TTI length can be less than a subframe length. The first and second TTIs may or may not have the same length. The first portion of the subframe can correspond to a first slot of the subframe and the second portion of the subframe can correspond to a second slot of the subframe.

According to a possible implementation, the second set of control decoding candidates corresponding to the first TTI length in the subframe can be monitored in the first slot of the subframe. A difference between the number of candidates in the fourth set and a sum of the number of candidates in the second set and the number of candidates in the third set can be at most a non-negative number. For example, a sum of the number of candidates in the second set and the number of candidates in the third set can be larger than a number of candidates in the fourth set. The non-negative number can be equal to the number of TTIs in the first portion of the subframe or the number of TTIs in the second portion of the subframe. The sum of the number of candidates of the second and third set can be, but is not necessarily, equal to the number of candidates in the fourth set.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 18:
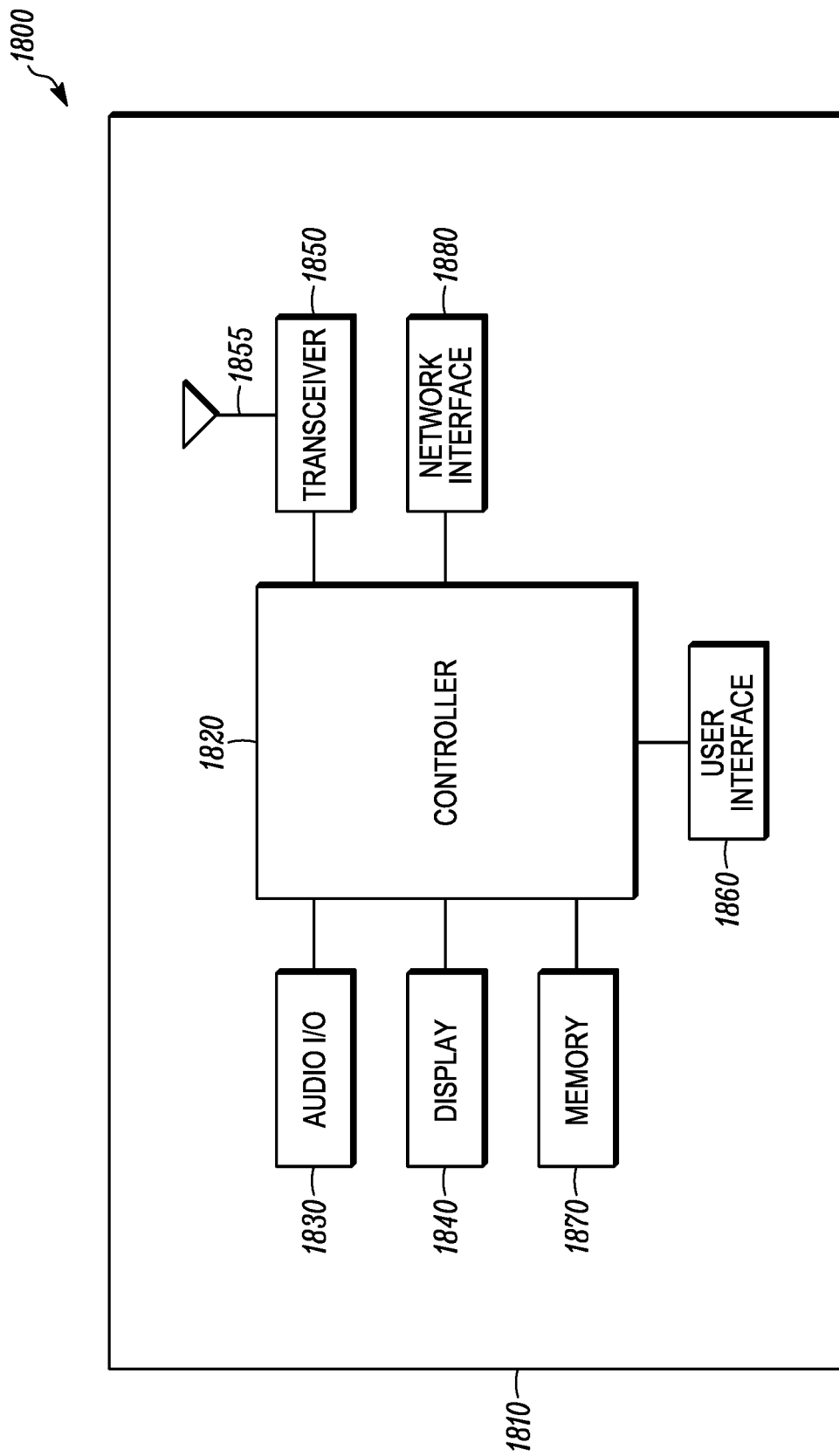
FIG. 18 is an example block diagram of an apparatus according to a possible embodiment.

FIG. 18 is an example block diagram of an apparatus 1800, such as the UE 110, the base station 120, or any other wireless communication device disclosed herein, according to a possible embodiment. The apparatus 1800 can include a housing 1810, a controller 1820 coupled to the housing 1810, audio input and output circuitry 1830 coupled to the controller 1820, a display 1840 coupled to the controller 1820, a transceiver 1850 coupled to the controller 1820, an antenna 1855 coupled to the transceiver 1850, a user interface 1860 coupled to the controller 1820, a memory 1870 coupled to the controller 1820, and a network interface 1880 coupled to the controller 1820. The apparatus 1800 does not necessarily include all of the illustrated elements for different embodiments of the present disclosure. The apparatus 1800 can perform the methods described in all the embodiments.

The display 1840 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1850 can include a transmitter and/or a receiver. The audio input and output circuitry 1830 can include a microphone, a speaker, a transducer, or any other audio input and output circuitry. The user interface 1860 can include a keypad, a keyboard, buttons, a touch pad, a joystick, a touch screen display, another additional display, or any other device useful for providing an interface between a user and an electronic device. The network interface 1880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1870 can include a random access memory, a read only memory, an optical memory, a solid state memory, a flash memory, a removable memory, a hard drive, a cache, or any other memory that can be coupled to an apparatus.

The apparatus 1800 or the controller 1820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1870 or elsewhere on the apparatus 1800. The apparatus 1800 or the controller 1820 may also use hardware to implement disclosed operations. For example, the controller 1820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1820 may be any controller or processor device or devices capable of operating an apparatus and implementing the disclosed embodiments. Some or all of the additional elements of the apparatus 1800 can also perform some or all of the operations of the disclosed embodiments.

According to a possible embodiment, the transceiver 1850 can receive a CSI request requesting the apparatus 1800 to feedback channel state information. The controller 1820 can determine whether the CSI request corresponds to regular latency based operation or reduced latency based operation. The controller 1820 can derive CSI based on a first reference resource when the CSI request corresponds to regular latency based operation. The controller 1820 can derive CSI based on a second reference resource when the CSI request corresponds to reduced latency based operation. The reduced latency based operation can have a latency less than the regular latency based operation. The controller 1820 can report the derived CSI to a network.

The regular latency based operation can be based on a first communication processing time. The reduced latency based operation can be based on a second communication processing time shorter than the first communication processing time. A regular latency based operation can be based on a first TTI length based on a first number of OFDM symbols. A reduced latency based operation can be based on at least a second TTI length based on a second number of OFDM symbols. The second number of OFDM symbols can be shorter than the first number of OFDM symbols.

According to a possible implementation, the CSI request can be received in a subframe. The second TTI length can be a duration within the subframe shorter than the length of the subframe. The CSI request can corresponds to a regular latency based operation when the CSI request is received in a control channel in at least a first symbol of the subframe. The CSI request can correspond to reduced latency based operation when the CSI request is received in a control channel received in a TTI with the second TTI length within the subframe.

According to a possible implementation, the CSI request can be received in a control channel. The controller 1820 can determine whether the CSI request corresponds to regular latency based operation or reduced latency based operation based on an indicator included in the control channel.

According to a possible implementation, the controller 1820 can derive CSI based on the second reference resource by deriving CSI based on a first subband size when the CSI request corresponds to reduced latency based operation. The first subband size can be determined based on a number of resource blocks used for reduced latency based operation.

According to a possible implementation, the controller 1820 can derive CSI based on a first reference resource by deriving CSI based on a second subband size when the CSI request corresponds to regular latency based operation. The second subband size can be determined based on a number of resource blocks used for regular latency based operation.

According to a possible implementation, the controller 1820 can derived CSI based on the first reference resource by deriving CSI based on a restriction to a first subset of precoders belonging to a set of precoders. The controller 1820 can derive CSI based on the second reference resource by deriving CSI based on a restriction to a second subset of precoders belonging to the set of precoders. The second subset of precoders can be different from the first subset of precoders.

According to other possible implementations, the controller 1820 can derive CSI based on the second reference resource by deriving CSI based on a restriction to a RI value associated with the CSI. The controller 1820 can also derive the CSI based on the second reference resource by deriving CSI based on a RI assumption corresponding to the regular latency operation.

According to another possible embodiment, the controller 1820 can control operations of the apparatus 1800. The transceiver 1850 can receive an indication from a network. The indication can request the device to feedback CSI corresponding to a first TTI length operation and/or a second TTI length operation.

When the indication requests CSI feedback for the first TTI length operation, the controller 1820 can determine a first reference TTI of a first TTI length based on the TTI in which the indication is received. The controller 1820 can also derive a channel measurement to compute the CSI using reference signals associated with the first reference TTI and/or can derive an interference measurement to compute the CSI using measurements made on resource elements associated with the first reference TTI.

When the indication requests CSI feedback for the second TTI length operation, the controller 1820 can determine a second reference TTI of a second TTI length based on the TTI in which the indication is received. The controller 1820 can also derive the channel measurement to compute the CSI using reference signals associated with the second reference TTI and/or can derive the interference measurement to compute the CSI using measurements made on resource elements associated with the second reference TTI.

The first TTI length operation can have a shorter time duration than the second TTI length operation and/or can have a same time duration as the second TTI length operation but can be associated with a shorter communication processing time than a communication processing time associated with the second TTI operation.

According to a possible implementation, the first reference TTI can include a first set of frequency resources. The second reference TTI can include a second set of frequency resources. The first set and the second set can be different. According to another possible implementation, the first set of frequency resources and/or the second set of frequency resources can be determined at least based on system bandwidth split between the first TTI length operation and the second TTI length operation.

According to another possible implementation, the controller 1820 can derive and report a first CQI index based on the first reference TTI and/or a second CQI index based on the second reference TTI. The first CQI index can be reported as an offset to the most recently reported second CQI index. The controller 1820 can derive and report the first CQI index based on the first reference TTI, the second CQI index based on the second reference TTI, and/or a third CQI index along with the first CQI index. The first CQI index can be derived based on a first overhead assumption associated with the first TTI reference. The third CQI index can be derived based on a second overhead assumption associated with the first TTI reference. An overhead assumption can include a number of PDCCH symbols and/or a number of CRS resource elements.

According to another possible embodiment, the transceiver 1850 can transmit control signaling containing a CSI request to a device. The CSI request can request the device to feedback channel state information corresponding to a first TTI length operation and/or a second TTI length operation. The CSI request can request the device to feedback CSI corresponding to a first TTI length operation in a control channel associated with the first TTI length operation and/or a second TTI length operation in a control channel associated with the second TTI length operation. The CSI request can be provided by a layer higher than physical layer signaling. The CSI request can request CSI feedback to be reported in a plurality of time instances. The time instances in the plurality of time instances can be equidistant in time.

The controller 1820 can schedule a set of time-frequency resources for the device to transmit the requested CSI. The transceiver 1850 can receive the CSI in the scheduled set of time-frequency resources.

According to a possible implementation, the set of time-frequency resources can include a first set of time-frequency resources and a second set of time-frequency resources. The first set of time-frequency resources can belong to a first TTI of the first length. The second set of time-frequency resources can belong to a second TTI of the second length.

The first TTI can occur before the second TTI in time. The first set of time-frequency resources and/or the second set of time-frequency resources can be determined at least based on system bandwidth split between the first TTI length operation and the second TTI length operation.

According to another possible embodiment, the transceiver 1850 can receive a configuration that configures a plurality of control decoding candidates. The controller 1820 can monitor a first set of the plurality of control decoding candidates associated with a first set of aggregation levels in a first TTI of a subframe. The controller 1820 can monitor a second set of the plurality of control decoding candidates associated with a second set of aggregation levels in a second TTI of the subframe. The first and second sets of the plurality of control decoding candidates can be different at least in one control decoding candidate. The first set of aggregation levels can be different than the second set of aggregation levels. A TTI can be a duration in which the apparatus 1800 can transmit and receive a transport block to and from higher layers than a physical layer.

According to a possible implementation, the first set and second set of the plurality of control decoding candidates can be based on a UE identifier, a subframe index, an index associated with the first TTI within the subframe, and/or an index associated with the second TTI within the subframe. The index associated with the first and/or the second TTI within the subframe can be a sTTI index within the subframe. The sTTI index can be associated with a TTI with a length shorter than a length of a subframe. The index associated with the first TTI and/or the second TTI within the subframe can be a slot index corresponding to the first TTI and/or the second TTI of the subframe.

According to another possible implementation, first TTI can be in a first slot of the subframe and the second TTI can be in a second slot of the subframe. According to another possible implementation, a number of decoding candidates in the first set and the second set of the plurality of control decoding candidates can be different.

According to another possible implementation, second set of the plurality of control decoding candidates can be based on the first set of the plurality of control decoding candidates. The controller 1820 can derive a position of control decoding candidates of the second set of the plurality of control decoding candidates based on knowledge of positions of control decoding candidates in the first set of the plurality of control decoding candidates.

According to another possible implementation, the first set of the plurality of control decoding candidates can be mapped to a first set of PRB-sets. The second set of the plurality of control decoding candidates can be mapped to a second set of PRB-sets. The first set of PRB-sets and the second set of PRB-sets can have at least one different PRB-set.

According to a possible embodiment, the controller 1820 can configure a plurality of control decoding candidates. The transceiver 1850 can transmit a first control signal in a control decoding candidate belonging to a first set of the plurality of control decoding candidates associated with a first set of aggregation levels in a first TTI of a subframe. The transceiver 1850 can transmit a second control signal in a control decoding candidate belonging to a second set of the plurality of control decoding candidates associated with a second set of aggregation levels in a second TTI of a subframe. The first and second sets of the plurality of control decoding candidates can be different at least in one control decoding candidate. The first set of aggregation levels can be different than the second set of aggregation levels. The first TTI can be in a first slot of the subframe and the second TTI is in a second slot of the subframe. The number of decoding candidates in the first set and the second set of the plurality of control decoding candidates can be different. The second set of the plurality of control decoding candidates can be based on the first set of the plurality of control decoding candidates.

According to a possible implementation, the first set and second set of the plurality of control decoding candidates can be based on a UE identifier, a subframe index, an index associated with the first TTI within the subframe, and/or an index associated with the second TTI within the subframe. The index associated with the first and/or the second TTI within the subframe can be a sTTI index within the subframe. A sTTI index can be associated with a TTI with a length shorter than a length of a subframe. The index associated with the first TTI and/or the second TTI within the subframe can be a slot index corresponding to the first TTI and/or the second TTI of the subframe.

According to a possible implementation, the first set of the plurality of control decoding candidates can be mapped to a first set of PRB-sets. The second set of the plurality of control decoding candidates can be mapped to a second set of PRB-sets. The first set of PRB-sets and the second set of PRB-sets can have at least one different PRB-set.

According to a possible embodiment, the transceiver 1850 can transmit and receive signals in subframes over a wireless network. The controller 1820 can monitor a first set of control decoding candidates corresponding to a first TTI length in a subframe when the apparatus 1800 is not configured to communicate using a second TTI length in the subframe. The second TTI length can be shorter than the first TTI length.

The controller 1820 can monitor a second set of control decoding candidates corresponding to the first TTI length in the subframe when the apparatus 1800 is configured to communicate using the second TTI length in the subframe. The first and the second sets can be different and the number of candidates in the second set is less than the number of candidates in the first set.

The controller 1820 can monitor a third set of control decoding candidates corresponding to the second TTI length in at least a first portion of the subframe when the apparatus 1800 is configured to communicate using the second TTI length in the subframe. A length of the first portion of the subframe can be less than the entire length of the subframe.

The controller 1820 can monitor a fourth set of control decoding candidates corresponding to the second TTI length in at least a second portion of the subframe when the apparatus 1800 is configured to communicate using the second TTI length in the subframe. The second portion can be different than the first portion.

According to a possible implementation, the number of candidates in the fourth set of control decoding candidates can be larger than the number of candidates in the third set of control decoding candidates. According to a possible implementation, the first portion of the subframe can correspond to a first TTI with a length associated with the second TTI length. According to a possible implementation, the second portion of the subframe corresponds to a second TTI different from the first TTI. The second TTI can have a length associated with the second TTI length. According to a possible implementation, the first portion of the subframe can correspond to a first slot of the subframe and the second portion of the subframe can correspond to a second slot of the subframe.

According to a possible implementation, the second set of control decoding candidates corresponding to the first TTI length in the subframe can be monitored in the first slot of the subframe. A difference between the number of candidates in the fourth set and a sum of the number of candidates in the second set and the number of candidates in the third set can be at most a non-negative number. The non-negative number can be equal to the number of TTIs in the first portion of the subframe or the number of TTIs in the second portion of the subframe.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, descriptions may be given relating embodiments to implementation within standardized operations of devices, which may require the devices to operate in specified manners. Thus, terms such as "shall," "is," and other similar terminology is used to suggest standardized operations of devices. However, such terms do not limit the embodiments in the sense that standardized operations may change, embodiments may operate in different contexts outside of standardized guidelines, embodiments may operate in different contexts according to different standardized guidelines, and other operations and elements are possible unless specifically required in the claims.

Furthermore, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method performed by a device, the method comprising:
    determining whether to
        monitor a first set of control decoding candidates that schedule communications of a first transmit time interval length in a subframe if the device is not configured to communicate using a second transmit time interval length in the subframe or
        monitor a second set of control decoding candidates that schedule communications of the first transmit time interval length in the subframe if the device is configured to communicate using the second transmit time interval length in the subframe;
    monitoring, in response to the determining whether to monitor, the first set of control decoding candidates in the subframe
        when the device is not configured to communicate using the second transmit time interval length in the subframe,
        wherein the second transmit time interval length is shorter than the first transmit time interval length; and
    monitoring, in response to the determining whether to monitor, the second set of control decoding candidates in the subframe
        when the device is configured to communicate using the second transmit time interval length in the subframe,
    wherein the first and the second sets are different, and
    wherein a number of candidates in the second set is less than a number of candidates in the first set.

2. The method according to claim 1, further comprising monitoring a third set of control decoding candidates that schedule communications in a transmit time interval of the second transmit time interval length in at least a first portion of the subframe when the device is configured to communicate using the second transmit time interval length in the subframe, where a length of the first portion of the subframe is less than the entire length of the subframe.

3. The method according to claim 2, further comprising monitoring a fourth set of control decoding candidates that schedule communications in the transmit time interval of the second transmit time interval length in at least a second portion of the subframe when the device is configured to communicate using the second transmit time interval length in the subframe, where the second portion is different than the first portion.

4. The method according to claim 3, wherein the number of candidates in the fourth set of control decoding candidates is larger than the number of candidates in the third set of control decoding candidates.

5. The method according to claim 3,
wherein the first portion of the subframe corresponds to a first transmit time interval with a length associated with the second transmit time interval length, and
wherein the second portion of the subframe corresponds to a second transmit time interval different from the first transmit time interval, where the second transmit time interval has a length associated with the second transmit time interval length.

6. The method according to claim 3,
wherein the first portion of the subframe corresponds to a first slot of the subframe and the second portion of the subframe corresponds to a second slot of the subframe, and
wherein the subframe comprises two slots.

7. The method according to claim 6, wherein the second set of control decoding candidates corresponding to the first transmit time interval length in the subframe is monitored in the first slot of the subframe.

8. The method according to claim 7, wherein a difference between a number of candidates in the fourth set and a sum of the number of candidates in the second set and a number of candidates in the third set is at most a non-negative number.

9. The method according to claim 8, wherein the non-negative number is equal to the number of transmit time intervals in the first portion of the subframe or the number of transmit time intervals in the second portion of the subframe.

10. The method according to claim 1, wherein the second set is a proper subset of the first set.

11. The method according to claim 1, wherein the first transmit time interval length is a length of a subframe.

12. The method according to claim 1, wherein determining whether to monitor the second set comprises determining whether to monitor the second set of control decoding candidates that schedule communications of the first transmit time interval length in the subframe if the device is configured to communicate using the second transmit time interval length in addition to using the first transmit time interval length in the subframe.

13. An apparatus comprising:
a transceiver that transmits and receives signals in subframes over a wireless network; and
a controller that
determines whether to
monitor a first set of control decoding candidates that schedule communications of a first transmit time interval length in a subframe if the apparatus is not configured to communicate using a second transmit time interval length in the subframe or
monitor a second set of control decoding candidates that schedule communications of the first transmit time interval length in the subframe if the apparatus is configured to communicate using the second transmit time interval length in the subframe,
monitors, in response to determining whether to monitor, the first set of control decoding candidates in the subframe when the apparatus is not configured to communicate using the second transmit time interval length in the subframe, wherein the second transmit time interval length is shorter than the first transmit time interval length, and
monitors, in response to determining whether to monitor, the second set of control decoding candidates in the subframe,
wherein the first set and the second set are different, and
wherein a number of candidates in the second set is less than a number of candidates in the first set.

14. The apparatus according to claim 13, wherein the controller monitors a third set of control decoding candidates that schedule communications in a transmit time interval of the second transmit time interval length in at least a first portion of the subframe when the apparatus is configured to communicate using the second transmit time interval length in the subframe, where a length of the first portion of the subframe is less than the entire length of the subframe.

15. The apparatus according to claim 14, wherein the controller monitors a fourth set of control decoding candidates that schedule communications in the transmit time interval of the second transmit time interval length in at least a second portion of the subframe when the apparatus is configured to communicate using the second transmit time interval length in the subframe, wherein the second portion is different than the first portion.

16. The apparatus according to claim 15, wherein a number of candidates in the fourth set of control decoding candidates is larger than a number of candidates in the third set of control decoding candidates.

17. The apparatus according to claim 15,
wherein the first portion of the subframe corresponds to a first transmit time interval with a length associated with the second transmit time interval length, and
wherein the second portion of the subframe corresponds to a second transmit time interval different from the first transmit time interval, where the second transmit time interval has a length associated with the second transmit time interval length.

18. The apparatus according to claim 15,
wherein the first portion of the subframe corresponds to a first slot of the subframe and the second portion of the subframe corresponds to a second slot of the subframe, and
wherein the subframe comprises two slots.

19. The apparatus according to claim 18, wherein the second set of control decoding candidates corresponding to the first transmit time interval length in the subframe is monitored in the first slot of the subframe.

20. The apparatus according to claim 19, wherein a difference between a number of candidates in the fourth set and a sum of the number of candidates in the second set and a number of candidates in the third set is at most a non-negative number.

21. The apparatus according to claim 20, wherein the non-negative number is equal to the number of transmit time intervals in the first portion of the subframe or the number of transmit time intervals in the second portion of the subframe.

22. The apparatus according to claim 13, wherein the controller determines whether to monitor the second set by determining whether to monitor the second set of control decoding candidates that schedule communications of the first transmit time interval length in the subframe if the apparatus is configured to communicate using the second transmit time interval length in the subframe in addition to using the first transmit time interval length in the subframe.

* * * * *